United States Patent
Kang et al.

(10) Patent No.: US 12,248,117 B2
(45) Date of Patent: Mar. 11, 2025

(54) METHOD AND DEVICE FOR CALCULATING VOLCANIC ASH DISPERSION PREDICTION INFORMATION IN REAL TIME

(71) Applicant: National Institute of Meteorological Sciences, Seogwipo-si (KR)

(72) Inventors: Mi Sun Kang, Seogwipo-si (KR); Woo Jeong Lee, Jeju-si (KR); Won Ick Seo, Seogwipo-si (KR); Sang Sam Lee, Seogwipo-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 18/396,362

(22) Filed: Dec. 26, 2023

(65) Prior Publication Data
US 2024/0345286 A1     Oct. 17, 2024

(30) Foreign Application Priority Data
Apr. 17, 2023   (KR) .......................... 10-2023-0049747

(51) Int. Cl.
*G01V 99/00*         (2024.01)
(52) U.S. Cl.
CPC .................................. *G01V 99/00* (2013.01)
(58) Field of Classification Search
CPC ..................................................... G01V 99/00
See application file for complete search history.

(56) References Cited

U.S. PATENT DOCUMENTS

| | | | | |
|---|---|---|---|---|
| 7,383,131 | B1* | 6/2008 | Wey ........................ | G01W 1/00 702/4 |
| 8,461,531 | B2* | 6/2013 | Tillotson ................ | G01N 21/71 250/338.5 |
| 8,917,385 | B1* | 12/2014 | Lietzke ..................... | G01J 3/28 356/45 |
| 9,222,873 | B2* | 12/2015 | Baumgardner ......... | G01S 17/95 |
| 10,336,465 | B2* | 7/2019 | Rennó .................... | B64D 15/22 |
| 2012/0068863 | A1* | 3/2012 | Tillotson ............... | G01S 13/003 340/963 |
| 2020/0104439 | A1* | 4/2020 | Ishihara .................. | G06F 30/25 |
| 2021/0192627 | A1* | 6/2021 | Mitchell ................ | G06F 16/29 |

OTHER PUBLICATIONS

Plumlee et al. Volcanic ash particles (2014).*

* cited by examiner

*Primary Examiner* — Mohamed Charioui
*Assistant Examiner* — Lynda Dinh
(74) *Attorney, Agent, or Firm* — Sughrue Mion, PLLC

(57) ABSTRACT

Provided is a method of calculating volcanic ash dispersion prediction information in real time. The method according to an embodiment of the present disclosure includes collecting volcanic ash advisory texts and weather forecast data in real time, preprocessing the collected volcanic ash advisory texts and weather forecast data, and calculating a volcanic ash eruption rate using some of the preprocessed volcanic ash advisory texts and weather forecast data.

2 Claims, 22 Drawing Sheets

VOLCANIC ASH DISPERSION PREDICTION

| ADVISORY TEXT TIME ▼ | ADVISORY TEXT | DOWNLOAD | ▲ VOLCANO NAME ▼ | ▲ REGION ▼ | ADVISORY TEXT NUMBER |
|---|---|---|---|---|---|
| 2023-02-02 06:00 | ○ | | SHEVELUCH | RUSSIA | 2023/52 |
| 2023-02-02 02:21 | ○ | ⬇ | SHEVELUCH | RUSSIA | 2023/51 |
| 2023-02-02 01:29 | ○ | ⬇ | SHEVELUCH | RUSSIA | 2023/50 |
| 2023-02-01 23:50 | ○ | | CHIKURACHKI | KURIL ISLANDSS | 2023/15 |
| 2023-02-01 23:45 | ○ | ⬇ | SUWANOSEJIMA | JAPAN | 2023/76 |
| 2023-02-01 23:20 | ○ | ⬇ | SUWANOSEJIMA | JAPAN | 2023/75 |
| 2023-02-01 18:00 | ○ | | CHIKURACHKI | KURIL ISLANDSS | 2023/14 |
| 2023-02-01 16:00 | ○ | ⬇ | CHIKURACHKI | KURIL ISLANDSS | 2023/13 |
| 2023-02-01 11:50 | ○ | | CHIKURACHKI | KURIL ISLANDSS | 2023/12 |
| 2023-02-01 06:00 | ○ | | CHIKURACHKI | KURIL ISLANDSS | 2023/11 |
| 2023-02-01 05:50 | ○ | | SUWANOSEJIMA | JAPAN | 2023/74 |
| 2023-02-01 00:53 | ○ | ⬇ | SUWANOSEJIMA | JAPAN | 2023/73 |
| 2023-02-01 00:00 | ○ | | CHIKURACHKI | KURIL ISLANDSS | 2023/10 |
| 2023-01-31 23:50 | ○ | | SHEVELUCH | RUSSIA | 2023/49 |
| 2023-01-31 21:48 | ○ | ⬇ | SHEVELUCH | RUSSIA | 2023/48 |
| 2023-01-31 20:51 | ○ | ⬇ | SHEVELUCH | RUSSIA | 2023/47 |
| 2023-01-31 18:00 | ○ | | CHIKURACHKI | KURIL ISLANDSS | 2023/9 |
| 2023-01-31 12:00 | ○ | | CHIKURACHKI | KURIL ISLANDSS | 2023/8 |
| 2023-01-31 11:50 | ○ | | SUWANOSEJIMA | JAPAN | 2023/72 |
| 2023-01-31 09:00 | ○ | | CHIKURACHKI | KURIL ISLANDSS | 2023/7 |

FIG. 3

```
Volcanic Ash Advisory Text

DTG: 20230214/0128Z
VAAC: TOKYO
VOLCANO: SAKURAJIMA (AIRA CALDERA) 282080
PSN: N3138 E13039 ........ VOLCANO LOCATION: 31 DEGREES 6 MINUTES NORTH LATITUDE,
                                            130 DEGREES 65 MINUTES EAST LONGITUDE
AREA: JAPAN
SUMMIT ELEV: 1117M ....... VOLCANO SUMMIT HEIGHT: 1117m
ADVISORY NR: 2023/66
INFO SOURCE: JMA HIMAWARI-9
AVIATION COLOUR CODE: NIL
ERUPTION DETAILS: EXPLODED AT 20230214/0044Z  FL080 EXTD S    ERUPTION DETAILS: ERUPTED AT 00:44 ON FEBRUARY 14, 2023
OBS VA DTG: 14/0100Z
OBS VA CLD: SFC/FL080 N3136 E13040 - N3133 E13044 - N3130 E13040 -
N3134 E13039 MOV SE 30KT
FCST VA CLD +6 HR: 14/0700Z SFC/FL080 N3032 E13350 - N3014 E13358 -
N2942 E13106 - N3008 E13046
FCST VA CLD +12 HR: 14/1300Z SFC/FL080 N2920 E13712 - N2900 E13708

N2843 E13346 - N2803 E13044 - N2843 E13029 - N2919 E13457
FCST VA CLD +18 HR: NO VA EXP
RMK: NIL
NXT ADVISORY: 20230214/0600Z=
```

FIG. 4

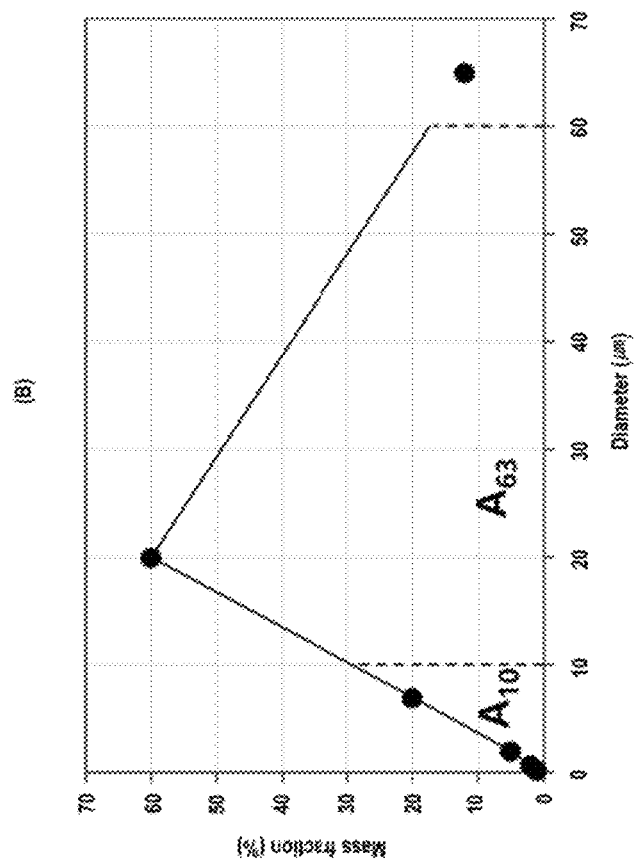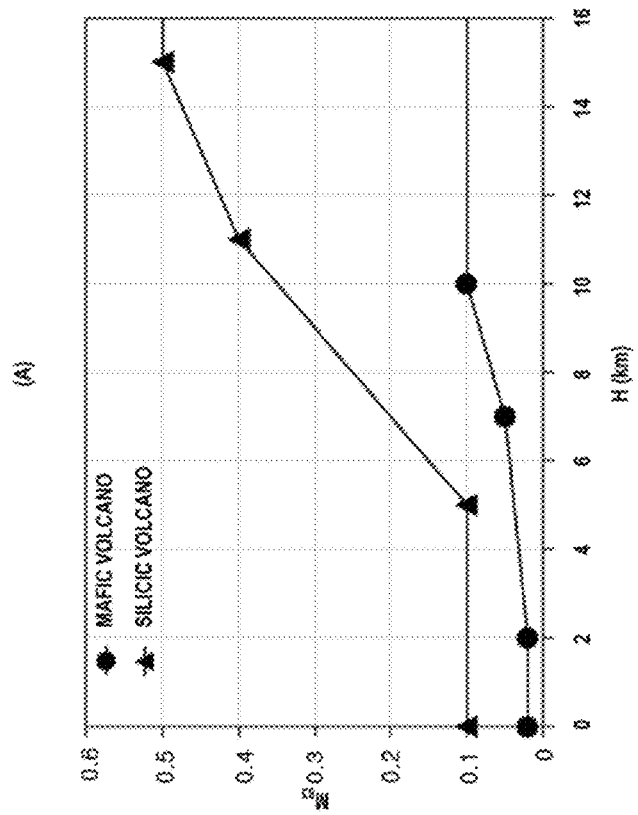
FIG. 5

METHOD AND DEVICE FOR CALCULATING VOLCANIC ASH DISPERSION PREDICTION INFORMATION IN REAL TIME

CROSS-REFERENCE TO RELATED APPLICATION

This application claims priority to and the benefit of Korean Patent Application No. 2023-0049747, filed on Apr. 17, 2023, the disclosure of which is incorporated herein by reference in its entirety.

BACKGROUND

1. Field of the Invention

The present disclosure relates to a method and device for calculating volcanic ash dispersion prediction information in real time. More specifically, the present disclosure relates to a method and device for calculating volcanic ash dispersion prediction information in real time, in which, in order to rapidly produce quantitative prediction information related to the impact of volcanic eruptions in countries neighboring Korea on Korea, immediately after volcanic ash advisory texts are collected, a volcanic ash dispersion prediction model is automatically operated by identifying information related to volcanic eruptions from the volcanic ash advisory text, and volcanic ash dispersion prediction information is produced in real time.

2. Discussion of Related Art

Among products of volcanic eruptions that are discharged during the volcanic eruptions, volcanic ash, which has a small particle size, may travel to distant regions depending on the atmospheric condition at the time of the eruption. Damage caused by such volcanic ash is not limited to the regions where the disaster occurred, but occurs widely and causes social and economic damage to transportation, industry, agriculture, forestry and fisheries, health, etc.

The Korea Meteorological Administration (KMA) has developed and is operating a volcanic ash dispersion prediction system based on a Hybrid Single-Particle Lagrangian Integrated Trajectory (HYSPLIT) model in order to produce quantitative prediction information related to the impact of volcanic eruptions in countries neighboring Korea on Korea.

However, the existing volcanic ash dispersion prediction system has a problem in that it is difficult to respond rapidly to volcanic eruptions because analysts should manually input information related to the volcanic eruptions. Accordingly, there is a continuing need for research on building a real-time system that operates automatically every time a volcano erupts by utilizing volcanic ash advisory texts produced during a volcanic eruption and improvement research on model for providing accurate prediction information.

Further, as volcanic gas ($SO_2$) that recently erupted from Italy's Mount Etna volcano was detected in some regions of China and Korea, the need to monitor and predict volcanic ash not only from volcanoes that occur in countries neighboring Korea on Korea, but also from distant volcanoes that could affect Korea in the event of a large-scale volcanic eruption is emerging.

Further, in order to produce highly reliable prediction information while providing various types of information, there is a need to establish a foundation that can utilize various pieces of climate data as well as climate data from the KMA's Global Data Assimilation and Prediction System (GDAPS) based on a unified model (UM) that is currently in use.

SUMMARY OF THE INVENTION

The present disclosure is directed to providing a method and device for calculating volcanic ash dispersion prediction information in real time, in which, in order to rapidly produce quantitative prediction information related to the impact of volcanic eruptions in countries neighboring Korea on Korea, immediately after volcanic ash advisory texts are collected, a volcanic ash dispersion prediction model is automatically operated by identifying information related to volcanic eruptions from the volcanic ash advisory text, and volcanic ash dispersion prediction information is produced in real time.

The present disclosure is also directed to providing a method and device for calculating volcanic ash dispersion prediction information in real time, in which the accuracy of a volcanic ash dispersion prediction model can be improved by applying a statistical ratio of particles with a diameter less than 63 μm for each type of volcanic eruption to an existing eruption rate equation that is calculated using an eruption column height of a volcano.

The present disclosure is also directed to providing a method and device for calculating volcanic ash dispersion prediction information in real time, in which, when a volcanic ash dispersion prediction model is operated, global climate data from the Korean Integrated Model (KIM) and the European Centre for Medium-Range Weather Forecasts (ECMWF) as well as climate data from the KMA's Global Data Assimilation and Prediction System (GDAPS) based on a unified model (UM) are used as meteorological input data for a volcanic ash dispersion prediction model, and thus various volcanic ash dispersion ranges and volcanic ash concentration calculation systems are provided.

The present disclosure is also directed to providing a method and device for calculating volcanic ash dispersion prediction information in real time, in which, by expanding a model region of a volcanic ash dispersion prediction model from the existing East Asia region to a region including Europe, paths of volcanic ash dispersed from distant volcanoes that can affect Korea in the event of a large-scale volcanic eruption can be predicted.

Technical problems to be achieved by the present disclosure are not limited to that described above, and other technical problems which have not been described will be clearly understood by those skilled in the field to which the present disclosure pertains from the present specification and the accompanying drawings.

According to an aspect of the present disclosure, there is provided a method of calculating volcanic ash dispersion prediction information in real time, which includes collecting volcanic ash advisory texts and weather forecast data in real time, preprocessing the collected volcanic ash advisory texts and weather forecast data, and calculating a volcanic ash eruption rate using some of the preprocessed volcanic ash advisory texts and weather forecast data.

The preprocessing of the collected volcanic ash advisory texts and weather forecast data may include extracting volcanic eruption-related information from the collected volcanic ash advisory text, wherein the volcanic eruption-related information may include one or more of a volcano location, a volcano height, an eruption time, and an eruption column height, and converting a format of the collected weather forecast data to a meteorological input data format for a volcanic ash dispersion prediction model.

The calculating of the volcanic ash eruption rate may include determining a mass fraction of particles with a diameter less than a reference value according to the type of volcanic eruption and the scale of a volcanic eruption, and calculating the volcanic ash eruption rate using at least one of the mass fraction of the particles and a ratio of a volcanic ash concentration to the mass fraction of the particles.

According to another aspect of the present disclosure, there is provided a device for calculating volcanic ash dispersion prediction information in real time, which includes a memory containing instructions, and a processor configured to execute the instructions, wherein the processor is configured to collect volcanic ash advisory texts and weather forecast data in real time, preprocess the collected volcanic ash advisory texts and weather forecast data, and calculate a volcanic ash eruption rate using some of the preprocessed volcanic ash advisory texts and weather forecast data.

The processor may be configured to extract volcanic eruption-related information from the collected volcanic ash advisory text, wherein the volcanic eruption-related information may include one or more of a volcano location, a volcano height, an eruption time, and an eruption column height, and convert a format of the collected weather forecast data to a meteorological input data format for a volcanic ash dispersion prediction model.

Solutions of the present disclosure are not limited to those described above, and other solutions which have not been described will be clearly understood by those skilled in the field to which the present disclosure pertains from the present specification and the accompanying drawings.

BRIEF DESCRIPTION OF THE DRAWINGS

The above and other aspects of the present invention will become more apparent to those of ordinary skill in the art by describing exemplary embodiments thereof in detail with reference to the accompanying drawings, in which:

FIG. 3 is a diagram for describing a display screen on which volcanic ash advisory texts are listed according to an embodiment of the present disclosure;

FIG. 4 is a diagram for describing a volcanic ash advisory text according to an embodiment of the present disclosure;

FIG. 5 is a set of graphs for describing a change in $M_{63}$ according to an eruption column height and a change in fraction according to a change in diameter according to an embodiment of the present disclosure.

DETAILED DESCRIPTION OF EXEMPLARY EMBODIMENTS

Figure 1:
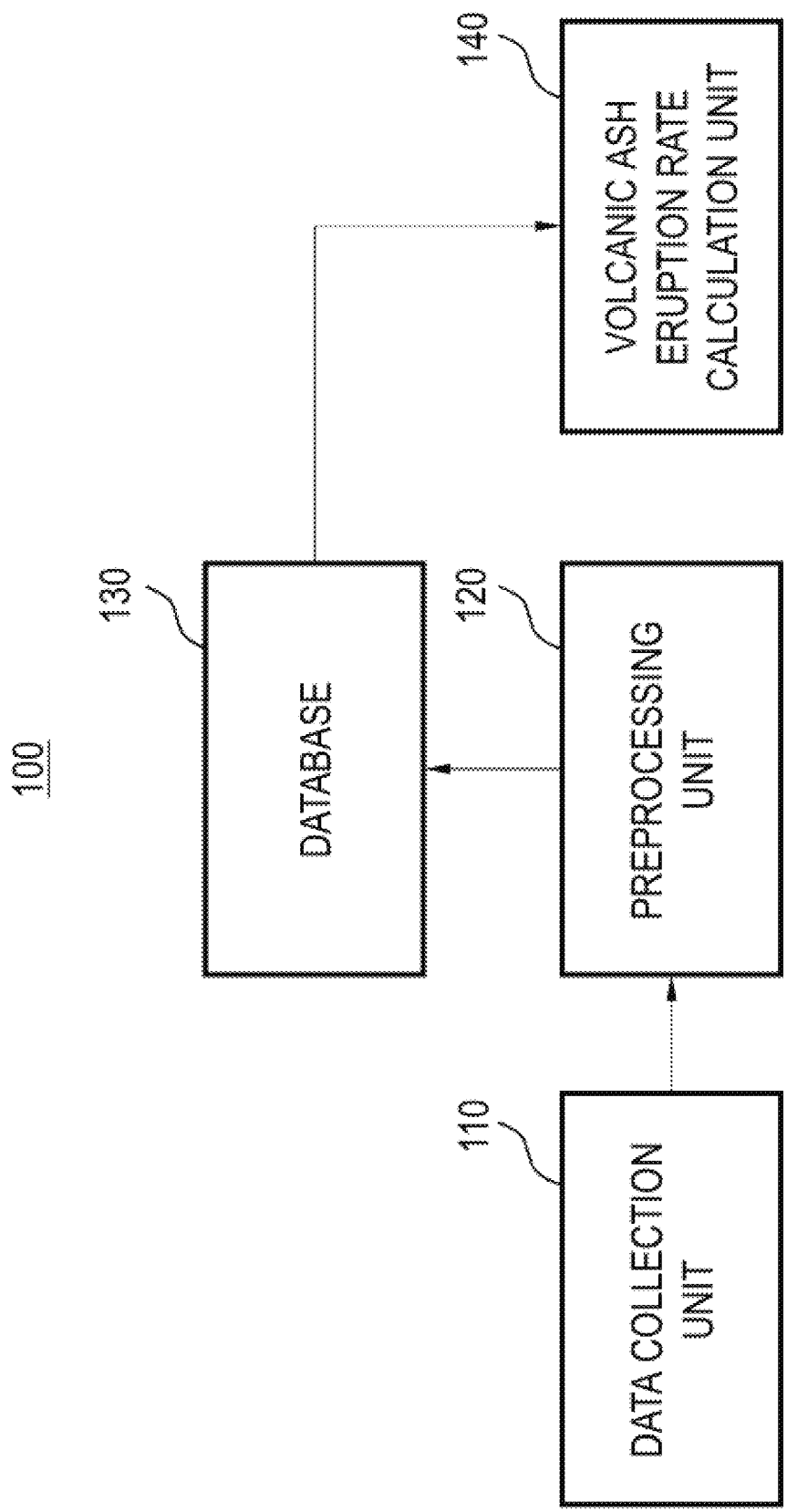
FIG. 1 is a block diagram for describing an internal structure of a device for calculating volcanic ash dispersion prediction information in real time according to an embodiment of the present disclosure.

The above-described features and advantages of the present disclosure will be clearly understood through the following detailed description taken in conjunction with the accompanying drawings. However, while the present disclosure is open to various modifications and alternative forms, specific embodiments thereof are shown by way of example in the drawings and will herein be described in detail.

Like numbers refer to like components throughout this specification. In addition, components with the same function within the scope of the same concept illustrated in the drawings of each embodiment will be described using the same reference numerals, and descriptions thereof will not be repeated.

When it is determined that detailed descriptions of related well-known functions or configurations may unnecessarily obscure the gist of the present disclosure, detailed descriptions thereof will be omitted. Further, the ordinal numbers (e.g., first, second, etc.) used in description of the specification are used only to distinguish one component from another component.

Further, the suffix "module," "unit," or "part" of a component used herein is assigned or incorporated for ease of writing the specification, and the suffix itself does not have a distinct meaning or role.

In the following embodiments, the singular forms "a" and "an" are intended to include the plural forms as well, unless the context clearly indicates otherwise.

In the following embodiments, it will be further understood that terms "comprise," "include," "comprising," and/or "including" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment can be implemented differently, a specific process order may be performed differently from the described order. For example, two processes described as consecutive may be performed substantially at the same time or performed in an order opposite to the described order.

In the following embodiments, when a first component is referred to as being "connected" to a second component, it includes not only the case in which the first component is directly connected to the second component, but also the case in which the first and second components are indirectly connected with another component interposed therebetween.

For example, in this specification, when components or the like are referred to as being "electrically connected," it includes not only the case in which the components or the like are directly electrically connected, but also the case in which the components or the like are indirectly electrically connected with another component interposed therebetween.

Hereinafter, a method and device for calculating volcanic ash dispersion prediction information in real time according to exemplary embodiments of the present disclosure will be described with reference to FIGS. 1-9D.

FIG. 1 is a block diagram for describing an internal structure of a device for calculating volcanic ash dispersion prediction information in real time according to an embodiment of the present disclosure.

Referring to FIG. 1, a device 100 for calculating the volcanic ash dispersion prediction information in real time includes a data collection unit 110, a preprocessing unit 120, a database 130, and a volcanic ash eruption rate calculation unit 140.

The data collection unit 110 may collect volcanic ash advisory texts and weather forecast data in real time. Specifically, the data collection unit 110 may collect volcanic ash advisory texts from nine Volcanic Ash Advisory Centers (VAAC), located in Tokyo, Toulouse, Darwin, Buenos Aires, Washington DC, Wellington, London, Anchorage, and Montreal, in real time (e.g., at one minute intervals). When a new volcanic ash advisory text is identified from among the collected volcanic ash advisory texts, the data collection unit 110 may immediately analyze the identified volcanic ash advisory text, list the volcanic ash advisory texts, and store the listed volcanic ash advisory texts in the database 130. According to the embodiment, the listed volcanic ash advisory texts may include one or more of an advisory text time, a volcano name and region, and an advisory text number.

The preprocessing unit 120 may preprocess the data collected by the data collection unit 110. The preprocessed data may be used as input data for a volcanic ash dispersion prediction model. As an example of preprocessing, the preprocessing unit 120 may extract volcanic eruption-related information from the collected volcanic ash advisory texts. The volcanic eruption-related information may include one or more of a volcano location, a volcano height, an eruption time, and an eruption column height. The volcanic eruption-related information may be used as input data for a volcanic ash dispersion prediction model, or may be used for calculating input data for the volcanic ash dispersion prediction model. For example, the eruption column height may be used for calculating a volcanic ash eruption rate, which is one piece of the input data for the volcanic ash dispersion prediction model.

As another example of preprocessing, the preprocessing unit 120 may convert a format of the weather forecast data collected by the data collection unit 110 so that the weather forecast data can be used as meteorological input data for the volcanic ash dispersion prediction model. The volcanic ash dispersion prediction model may include a Hybrid Single-Particle Lagrangian Integrated Trajectory (HYSPLIT) model, and the meteorological input data of the model has an Air Resource Laboratory (ARL) format. Therefore, the preprocessing unit 120 may convert a format of the collected weather forecast data to the ARL format. Thereafter, when a new volcanic ash advisory text is identified, the preprocessing unit 120 may use meteorological input data closest to the time of arrival of the new volcanic ash advisory text from among the meteorological input data in the ARL format as an input weather field of the HYSPLIT model.

Meanwhile, previously, only climate data from the KMA's Global Data Assimilation and Prediction System (GDAPS) based on a unified model (UM) has been used as meteorological input data, but in the present disclosure, the system was improved to utilize global climate data from the Korean Numerical Forecasting Model (KIM) and the European Center for Medium-Range Weather Forecasts (ECMWF) to produce volcanic ash dispersion prediction information including various volcanic ash concentrations and volcanic ash dispersion ranges.

These pieces of climate data may be converted to a format so as to be used as an input weather field for the HYSPLIT model. As an example, UM climate data in a post processing (PP) format may be converted to a GRIdded Binary (GRIB) format and then converted to the ARL format. As another example, KIM climate data in a NetCDF format may be directly converted to the ARL format. As still another example, ECMWF climate data in the GRIB format may be converted to a Meteorology Chemistry Interface Processor (MCIP) format and then converted to the ARL format.

Currently, the forecast regions for each piece of climate data are divided into regions (60° E to 170° E, 10° N to 65° N) of East Asia and regions (1° E to 170° E, 1° N to 65° N) of Europe, including Mount Etna and Sinabung Volcanoes, which are major volcanoes. The regions include some jurisdictions of four volcanic ash advisory centers (Tokyo, Toulouse, Darwin, and London). In the future, the forecast regions will be sequentially expanded to cover the entire globe so that information from all nine volcanic ash advisory centers can be included.

When the volcanic eruption-related information and the meteorological input data are prepared through preprocessing, the volcanic ash dispersion prediction model is operated so that predicted values of a volcanic ash concentration and a volcanic ash deposition amount can be calculated at three-hour intervals during a 72-hour forecast period. In the future, the forecast time will be expanded from 72 hours to 168 hours. The calculated volcanic ash concentration may be displayed in the form of a picture file by output altitude, region, and/or forecast time. Furthermore, the picture file may be displayed through the web so that a user can rapidly check the volcanic ash concentration.

The volcanic ash eruption rate calculation unit 140 may calculate a volcanic ash eruption rate using some of the preprocessed volcanic ash advisory texts and weather forecast data.

$$\text{eruption rate} = \text{Re} \times M_{63} \times e^{f(H)}, \quad \text{[Equation 1]}$$
$$\text{Re} = A_{10}/A_{63},$$
$$f(H) = 7.526 \times H^{0.2505}$$

Equation 1 is an improvement on the existing empirical relationship "eruption rate=$e^{f(H)}$, f(H)=$7.526 \times H^{0.2505}$," and it can be seen that $M_{63}$ and Re are further considered. $M_{63}$ denotes a mass fraction of particles in volcanic ash that have a diameter of less than 63 μm and are floatable in the air for several hours or more. Re denotes a ratio (Re=$A_{10}/A_{63}$) of a $PM_{10}$ concentration to the mass fraction of the particles in the volcanic ash that have a diameter of less than 63 μm. $PM_{10}$ denotes dust with a diameter of 10 μm or less, and the $PM_{10}$ concentration refers to a value obtained by measuring a concentration of dust with a diameter of 10 μm or less. In this specification, the $PM_{10}$ concentration may be referred to as "volcanic ash concentration." H denotes an eruption column height.

$M_{63}$ is determined by the type of volcanic eruption (e.g., mafic volcano, silicic volcano) and the scale of a volcanic eruption (e.g., the eruption column height). $M_{63}$ of mafic volcanoes may be calculated by Equation 2, and $M_{63}$ of silicic volcanoes may be calculated by Equation 3.

$$\begin{cases} M_{63} = 0.02, & \text{when } H(\text{km}) < 2 \\ M_{63} = 0.006 \times H + 0.008, & \text{when } 2 \leq H(\text{km}) < 7 \\ M_{63} = (1/60) \times H - 1/15, & \text{when } 2 \leq H(\text{km}) < 10 \\ M_{63} = 0.1, & \text{when } H(\text{km}) \geq 10 \end{cases} \quad \text{[Equation 2]}$$

$$\begin{cases} M_{63} = 0.02, & \text{when } H(\text{km}) < 2 \\ M_{63} = 0.006 \times H + 0.008, & \text{when } 2 \leq H(\text{km}) < 7 \\ M_{63} = (1/60) \times H - 1/15, & \text{when } 2 \leq H(\text{km}) < 10 \\ M_{63} = 0.1, & \text{when } H(\text{km}) \geq 10 \end{cases} \quad \text{[Equation 3]}$$

Figure 2:
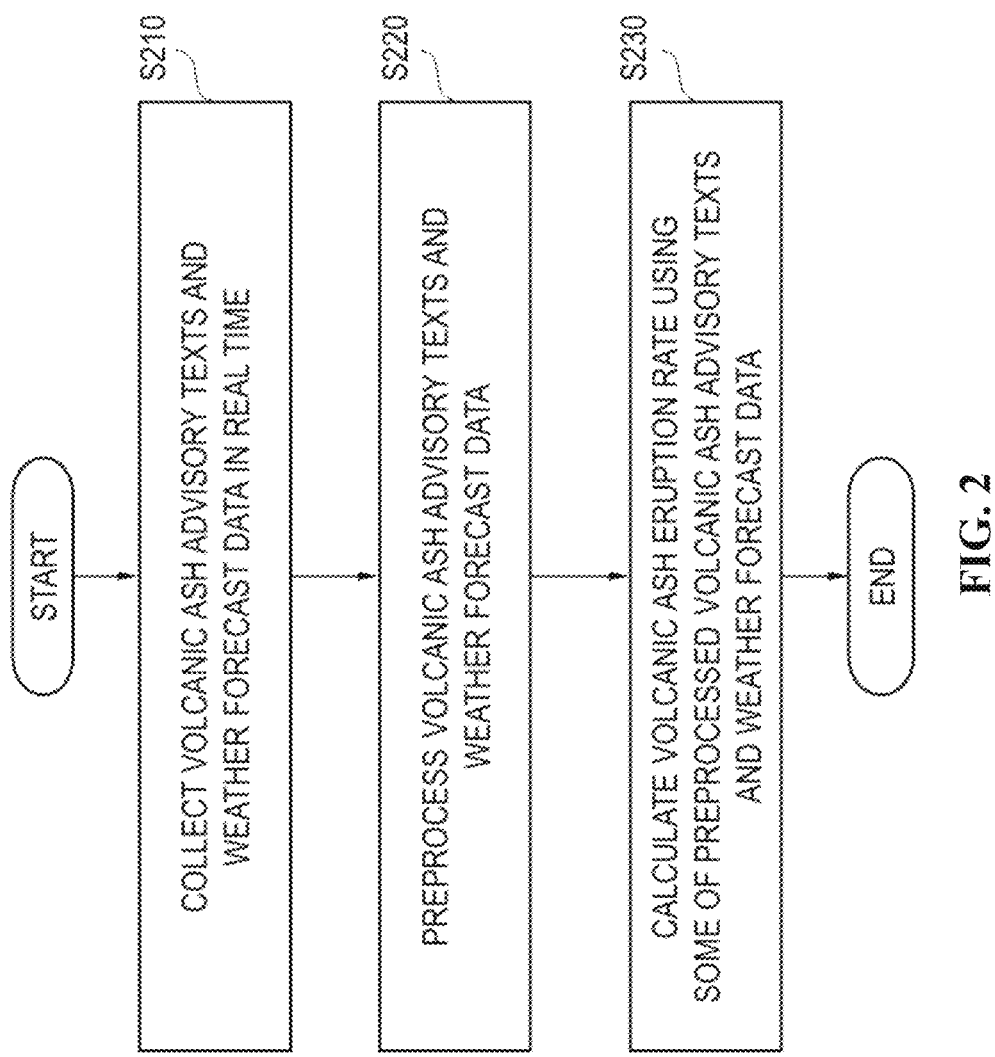
FIG. 2 is a flowchart for describing a method of calculating volcanic ash dispersion prediction information in real time according to an embodiment of the present disclosure.

FIG. 2 is a flowchart for describing a method of calculating volcanic ash dispersion prediction information in real time according to an embodiment of the present disclosure. The method illustrated in FIG. 2 may be performed by the device 100 for calculating the volcanic ash dispersion prediction information in real time described with reference to FIG. 1.

Referring to FIG. 2, the device 100 for calculating the volcanic ash dispersion prediction information in real time collects volcanic ash advisory texts and weather forecast data in real time (S210). The volcanic ash advisory texts may be collected at one-minute intervals from nine volcanic ash advisory centers. The weather forecast data may include UM-based GDAPS data, KIM's global climate data, and ECMWF's global climate data.

According to the embodiment, operation S210 may include, when a new volcanic ash advisory text is identified from among the collected volcanic ash advisory texts, analyzing the identified volcanic ash advisory text and listing the volcanic ash advisory texts, and storing the listed volcanic ash advisory texts in the database 130. The listed volcanic ash advisory text may include one or more of an advisory text time, a volcano name and region, and an advisory text number.

After operation S210, the device 100 for calculating the volcanic ash dispersion prediction information in real time preprocesses the volcanic ash advisory texts and weather forecast data, which are collected in real time (S220). According to the embodiment, operation S220 may include extracting volcanic eruption-related information from the collected volcanic ash advisory texts, and converting a format of the collected weather forecast data to a meteorological input data format for a volcanic ash dispersion prediction model.

The volcanic eruption-related information may include a volcano location, a volcano height, an eruption time, and an eruption column height. The converting of the format of the collected weather forecast data may include converting UM climate data in a PP format to a GRIB format and then converting the GRIB format to an ARL format, converting KIM climate data in a NetCDF format to the ARL format, and converting ECMWF climate data in the GRIB format to an MCIP format and then converting the MCIP format to the ARL format.

After operation S220, the device 100 for calculating the volcanic ash dispersion prediction information in real time calculates a volcanic ash eruption rate using some of the preprocessed volcanic ash advisory texts and weather forecast data (S230). The volcanic ash eruption rate may be calculated using Equation 1 described above.

FIG. 3 is a diagram for describing a display screen on which volcanic ash advisory texts are listed according to an embodiment of the present disclosure.

Referring to FIG. 3, it can be seen that the collected volcanic ash advisory texts are listed on the display screen by advisory text time, volcano name and region, advisory text number, and the like. Furthermore, the display screen may provide a function for displaying the corresponding volcanic ash advisory text on the screen for each volcanic ash advisory text, a function for downloading the corresponding volcanic ash advisory text to an external device, and a function for checking the prediction results of a volcanic ash dispersion prediction model. The volcanic eruption-related information including the volcano location, volcano height, eruption time, and eruption column height may be extracted from the volcanic ash advisory texts listed as in FIG. 3, and the extracted volcanic eruption-related information may be used as the input data for the volcanic ash dispersion prediction model.

FIG. 4 is a diagram for describing a volcanic ash advisory text according to an embodiment of the present disclosure.

Referring to the volcanic ash advisory text illustrated in FIG. 4, the corresponding volcanic ash advisory text has been collected from the volcanic ash advisory center in Tokyo among nine volcanic ash advisory centers, and it can be seen that the 1,117 m high Sakurajima volcano, located at 31 degrees 36 minutes north latitude and 130 degrees 39 minutes east longitude, erupted at 00:44 on Feb. 14, 2023. Among the volcanic eruption-related information, an eruption column height H may be used for calculating a volcanic ash eruption rate, which is one piece of input data for a volcanic ash dispersion prediction model.

FIG. 5 is a set of graphs for describing a change in $M_{63}$ according to an eruption column height and a change in fraction according to a change in diameter according to an embodiment of the present disclosure.

The volcanic ash eruption rate may be calculated based on Equation 1 described above. Equation 1 is an improvement on the existing empirical relationship "eruption rate=$e^{f(H)}$, $f(H)=7.526 \times H^{0.2505}$" by further considering $M_{63}$ and Re.

In Equation 1, $M_{63}$ denotes a mass fraction of particles in volcanic ash that have a diameter of less than 63 μm and are floatable in the air for several hours or more. $M_{63}$ is determined by the type of volcanic eruption (e.g., mafic volcano, silicic volcano) and the scale of a volcanic eruption (e.g., an eruption column height). Changes in $M_{63}$ according to eruption scales of mafic and silicic volcanoes are shown in A of FIG. 5. In A of FIG. 5, the change in $M_{63}$ according to the eruption scale of the mafic volcano may be expressed by Equation 2. In A of FIG. 5, the change in $M_{63}$ according to the eruption scale of the silicic volcano may be expressed by Equation 3.

In Equation 1, Re denotes a ratio (Re=$A_{10}/A_{63}$) of a $PM_{10}$ concentration to the mass fraction of the particles in the volcanic ash that have a diameter of less than 63 μm. The reason for applying Re is to be able to verify the volcanic ash dispersion prediction model using the $PM_{10}$ concentration, which is ground observation data. A change in mass fraction according to a particle diameter (0 to 63 μm) is shown in B of FIG. 5.

As soon as weather forecast data is collected, a meteorological input data format is converted to an ARL format, which is a meteorological input data format for a HYSPLIT model, and when a new volcanic ash advisory text is identified, meteorological input data closest to the time of arrival of the new volcanic ash advisory text from among the meteorological input data in the ARL format is used as an input weather field of the HYSPLIT model.

Meanwhile, previously, only climate data from the KMA's GDAPS based on a UM has been used as meteorological input data, but in the present disclosure, the system was improved to utilize global climate data from the KIM and the ECMWF to produce volcanic ash dispersion prediction information including various volcanic ash concentrations and volcanic ash dispersion ranges.

These pieces of climate data may be converted to a format so as to be used as an input weather field for the HYSPLIT model. As an example, UM climate data in a PP format may be converted to a GRIB format and then converted to the ARL format. As another example, KIM climate data in a NetCDF format may be directly converted to the ARL format. As still another example, ECMWF climate data in the GRIB format may be converted to an MCIP format and then converted to the ARL format.

Currently, the forecast regions for each piece of climate data are divided into regions (60° E to 170° E, 10° N to 65° N) of East Asia and regions (1° E to 170° E, 1° N to 65° N) of Europe, including Mount Etna and Sinabung Volcanoes, which are major volcanoes. The regions include some jurisdictions of four volcanic ash advisory centers (Tokyo, Toulouse, Darwin, and London). In the future, the forecast regions will be sequentially expanded to cover the entire globe so that information from all nine volcanic ash advisory centers can be included.

When the volcanic eruption-related information and the meteorological input data are prepared through preprocessing, the volcanic ash dispersion prediction model is operated so that predicted values of a volcanic ash concentration and a volcanic ash deposition amount can be calculated at three-hour intervals during a 72-hour forecast period. In the future, the forecast time will be expanded from 72 hours to 168 hours. The calculated volcanic ash concentration may be displayed in the form of a picture file by output altitude, region, and/or forecast time. Furthermore, the picture file may be displayed through the web so that a user can rapidly check the volcanic ash concentration.

FIGS. 6-9D are diagrams for describing display screens on which a volcanic ash concentration and a volcanic ash deposition amount are displayed according to an embodiment of the present disclosure. Specifically, FIGS. 6-9D show screens on which a volcanic ash concentration and a volcanic ash deposition amount for the case of Sakurajima Volcano, which erupted at 01:28 Coordinated Universal Time (UTC) on Feb. 14, 2023, are displayed.

Figure 6:
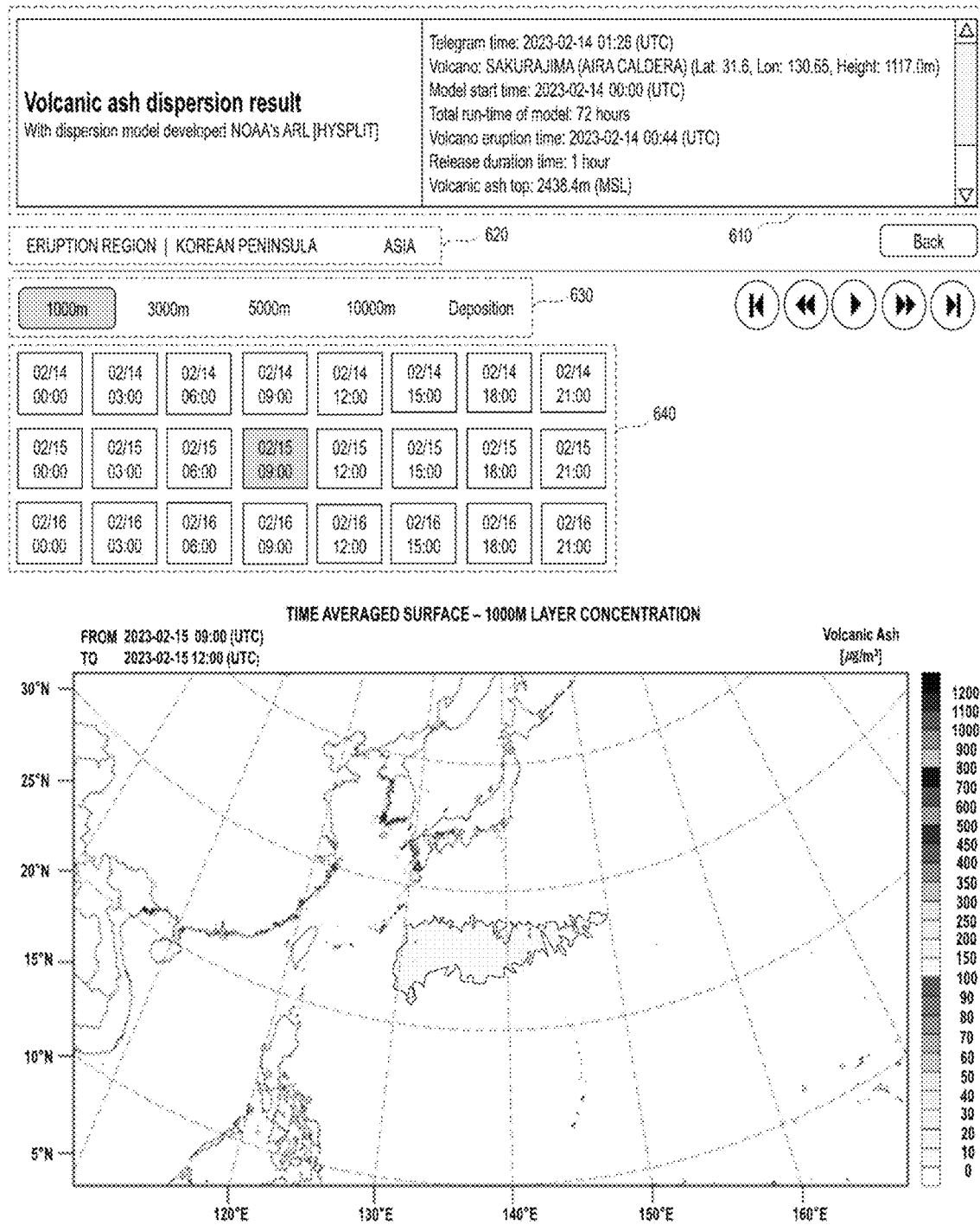
FIGS. 6-9D are diagrams for describing display screens on which a volcanic ash concentration and a volcanic ash deposition amount are displayed according to an embodiment of the present disclosure.
Figure 7A:
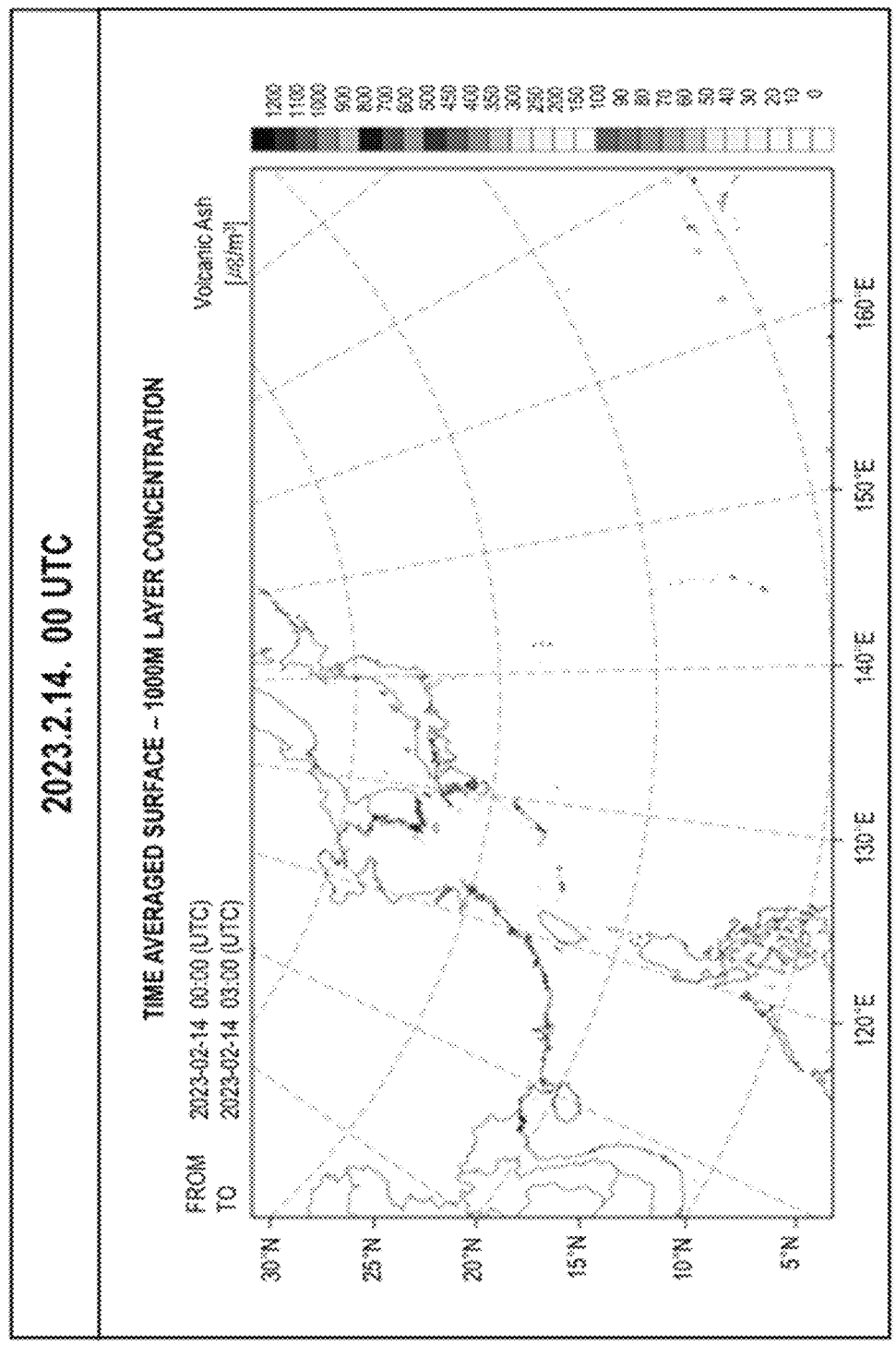
Figure 7B:
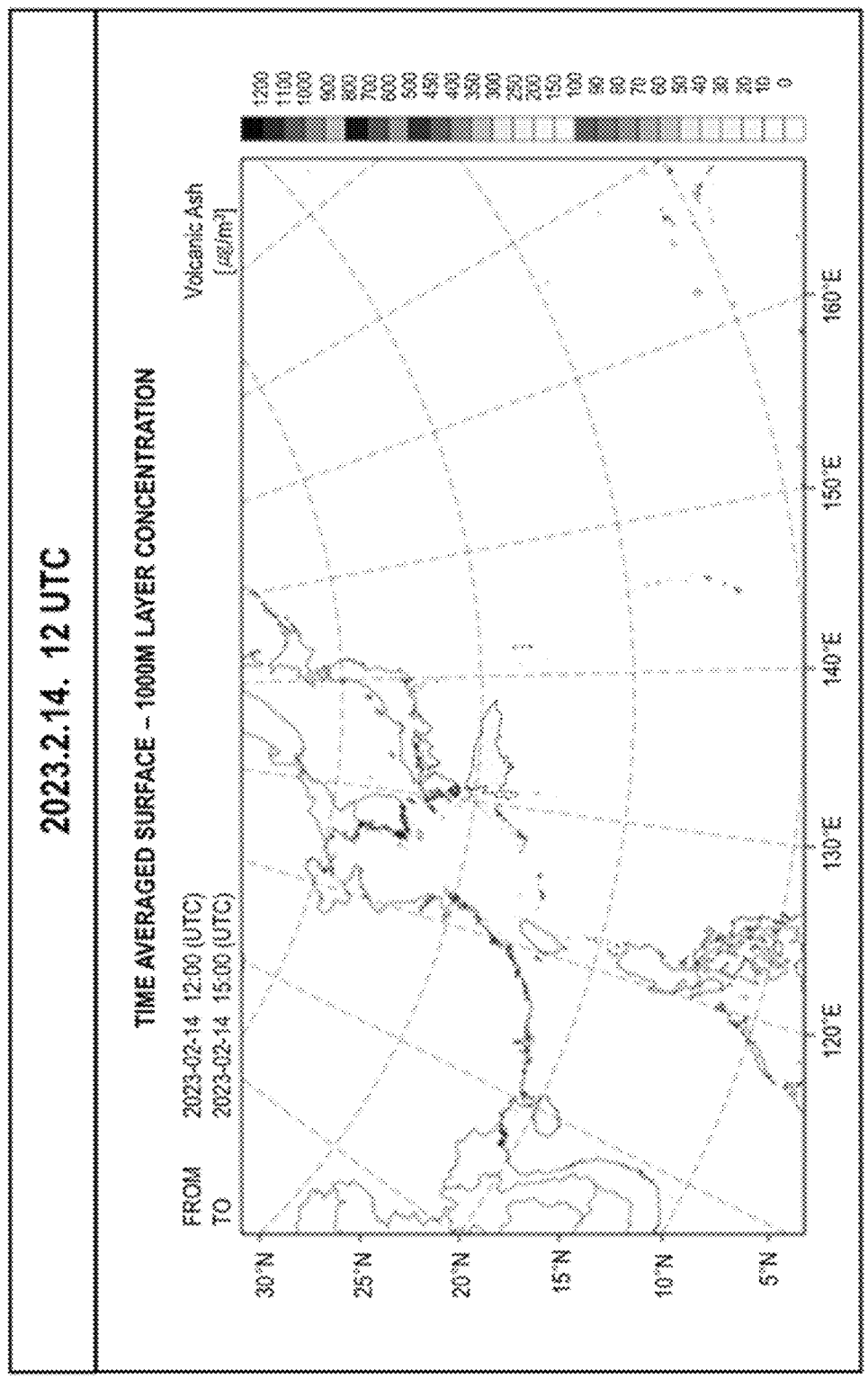
Figure 7C:
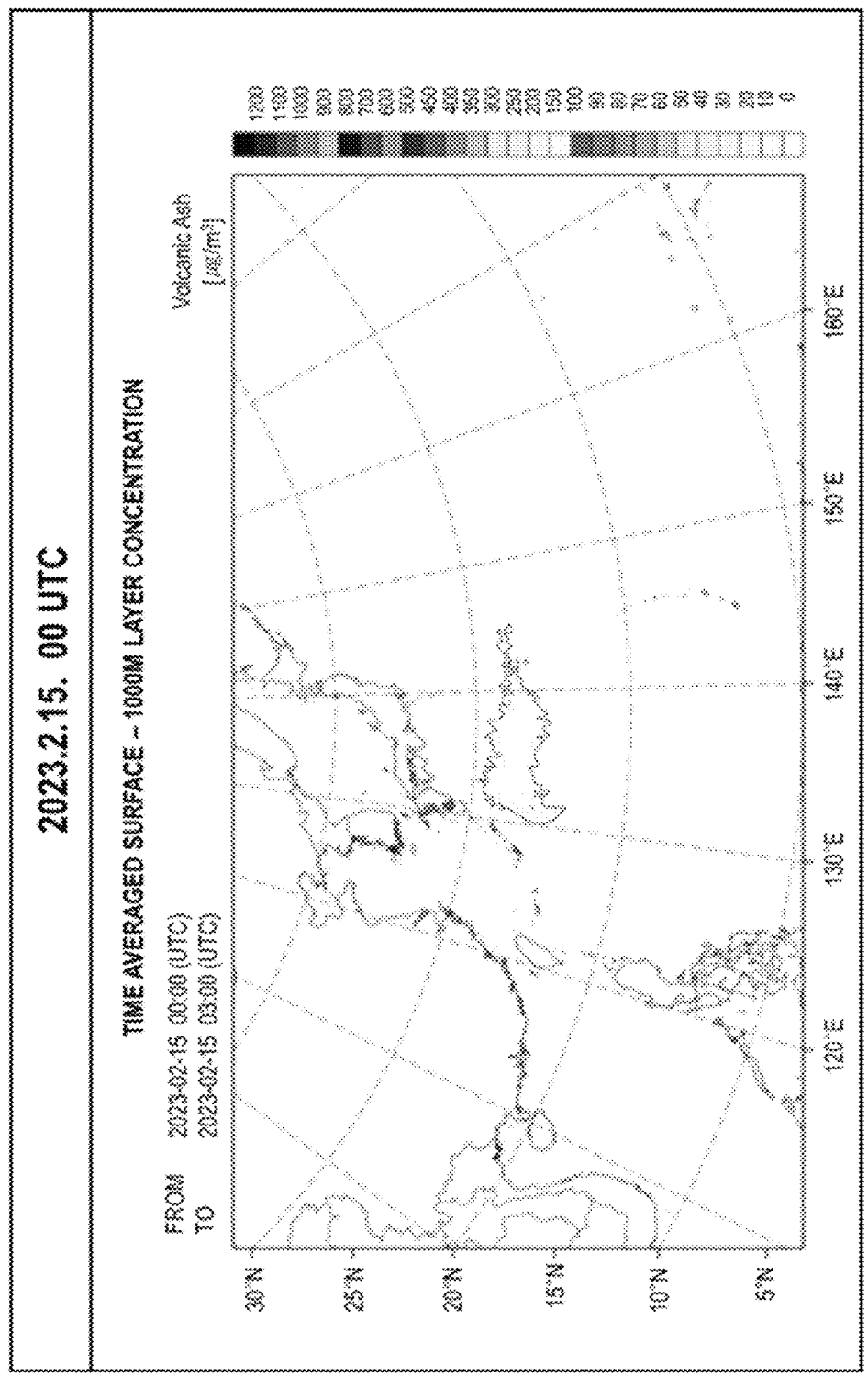
Figure 7D:
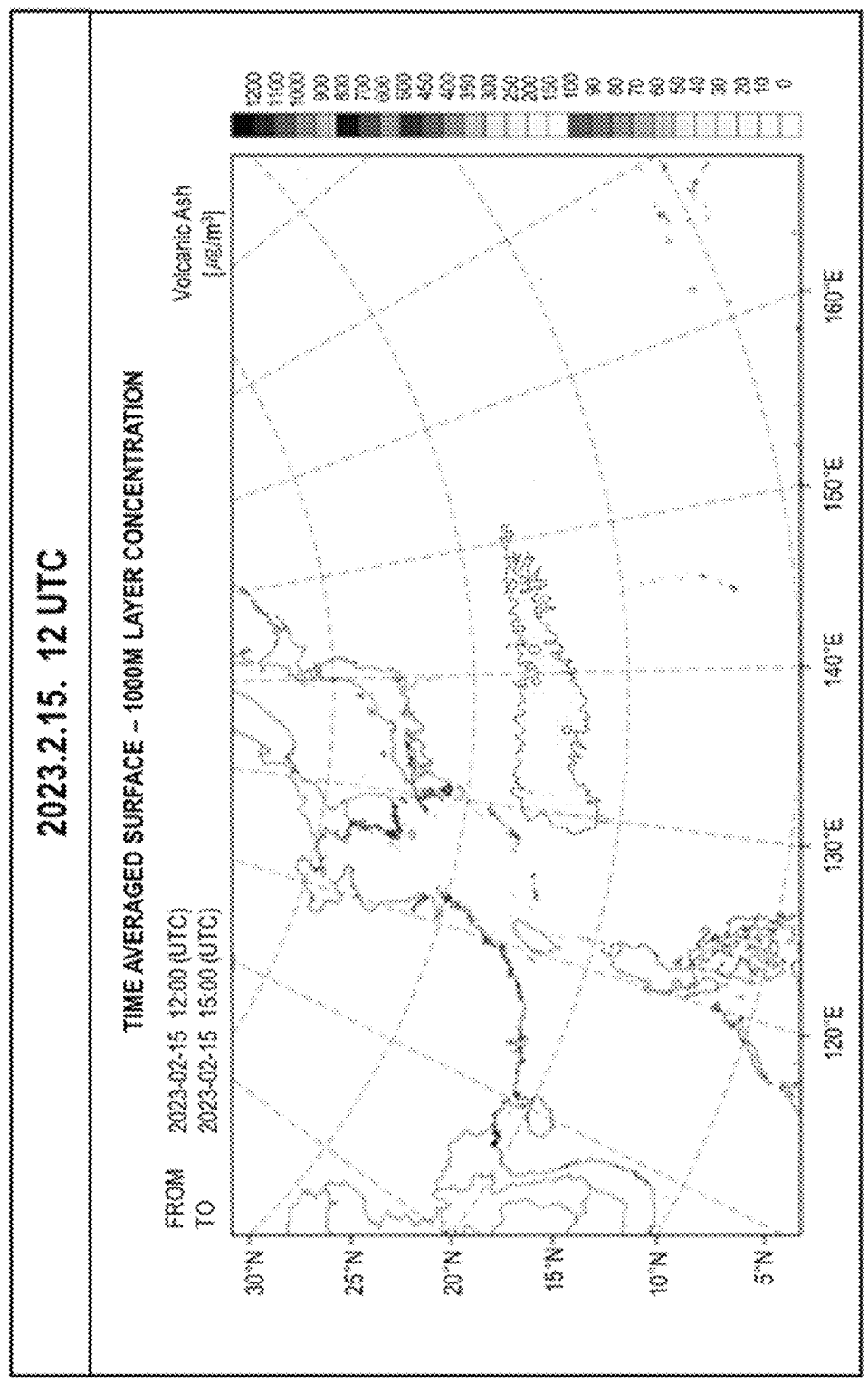
Figure 7E:
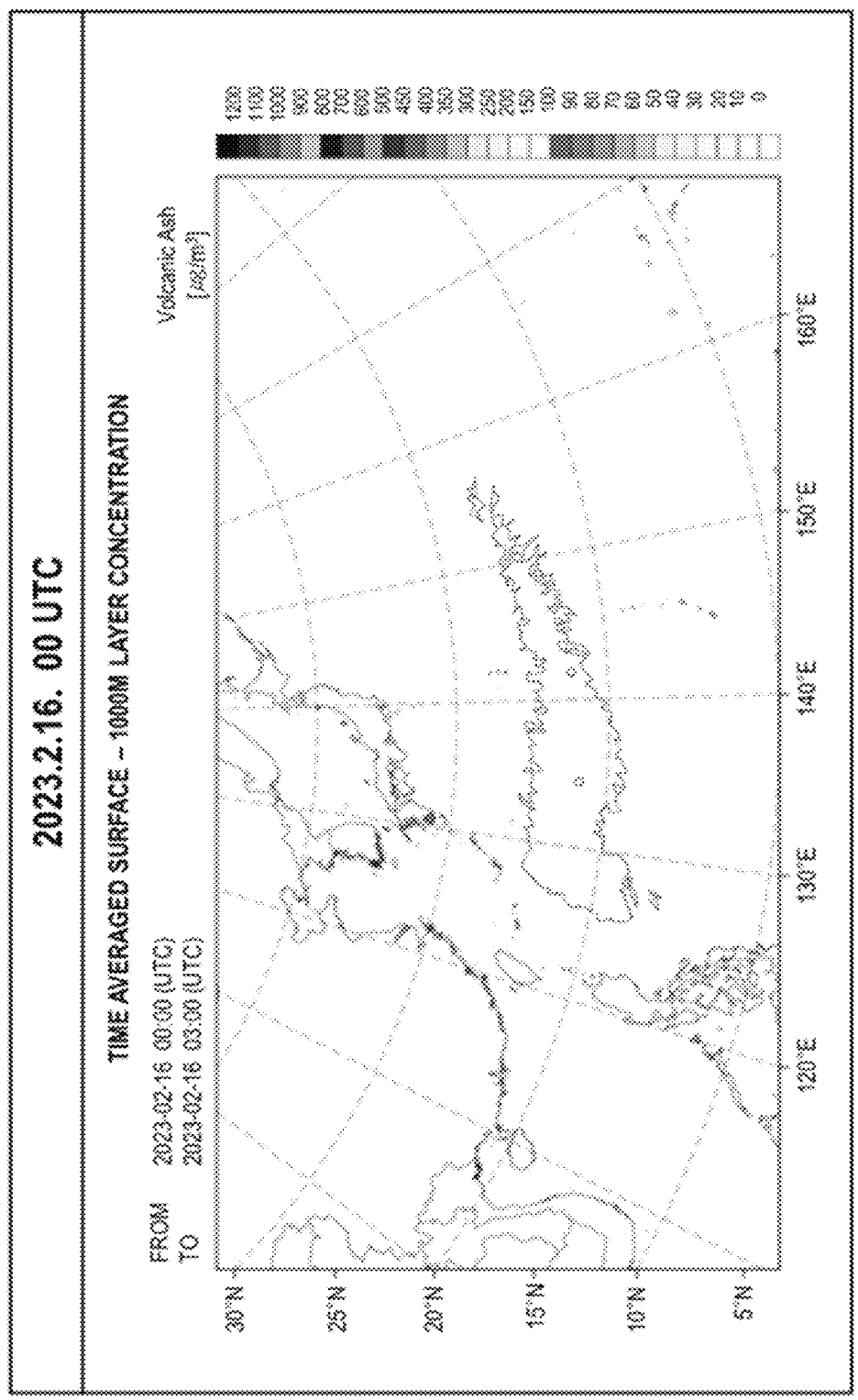
Figure 7F:
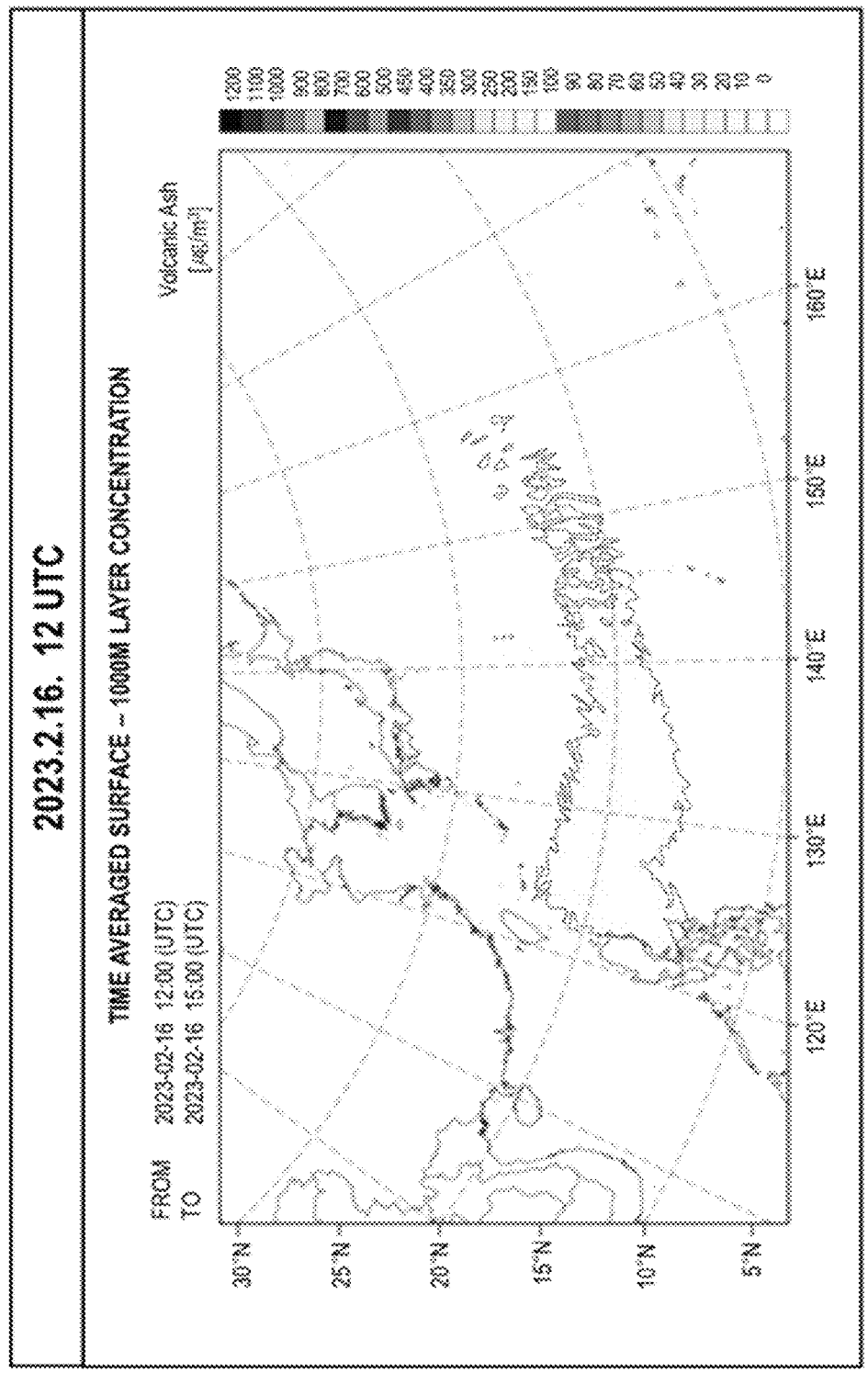
Figure 8A:
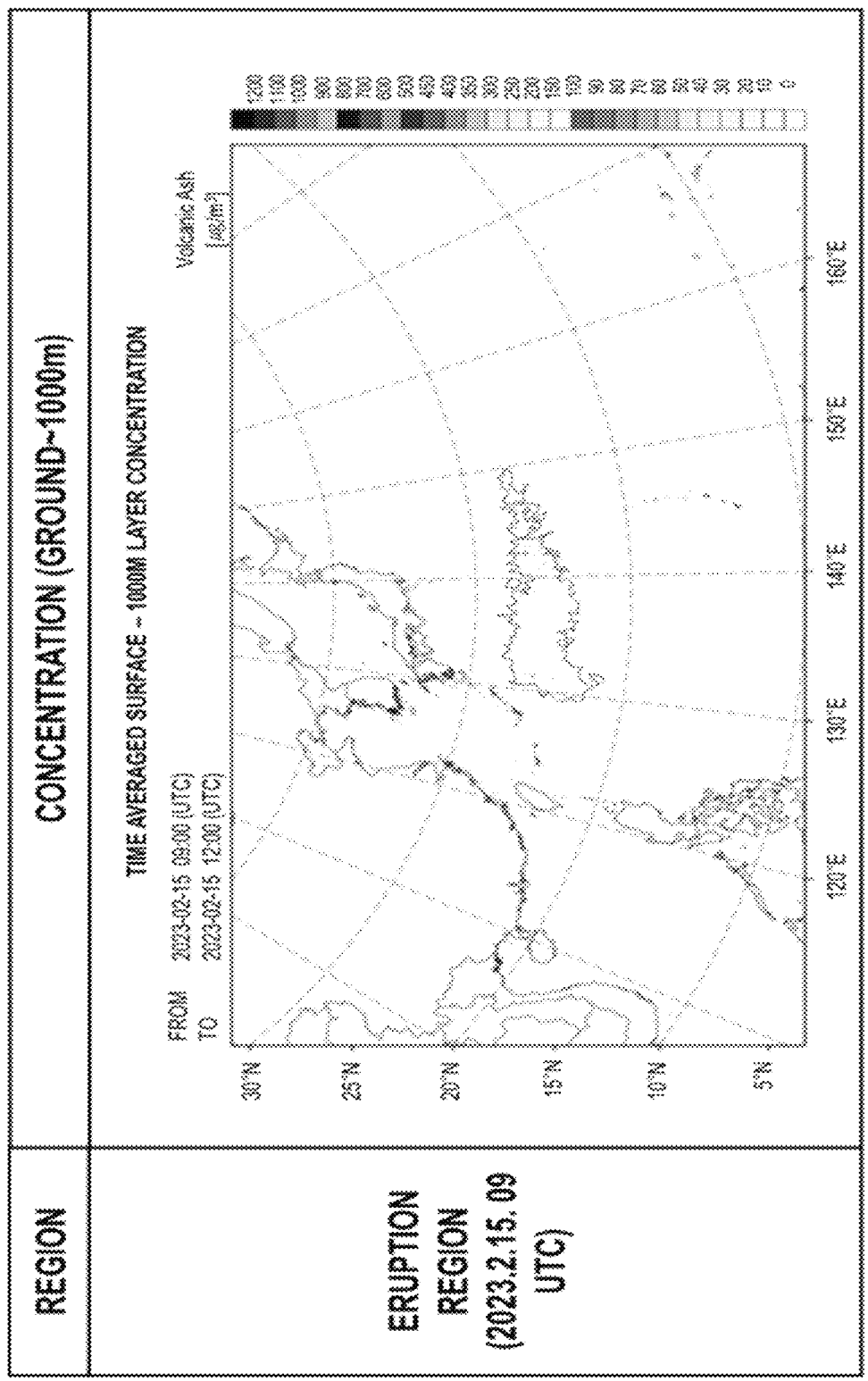
Figure 8B:
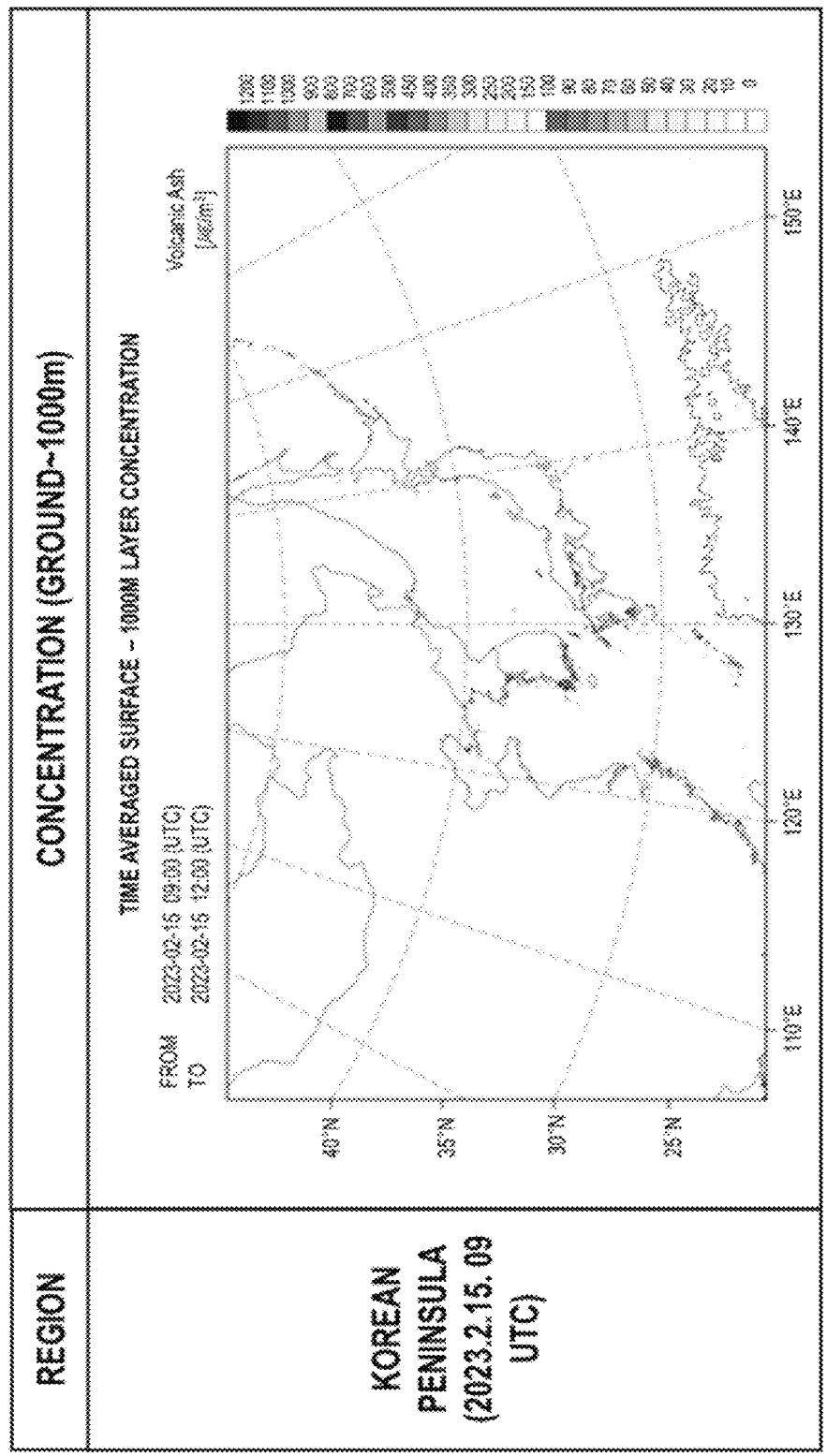
Figure 8C:
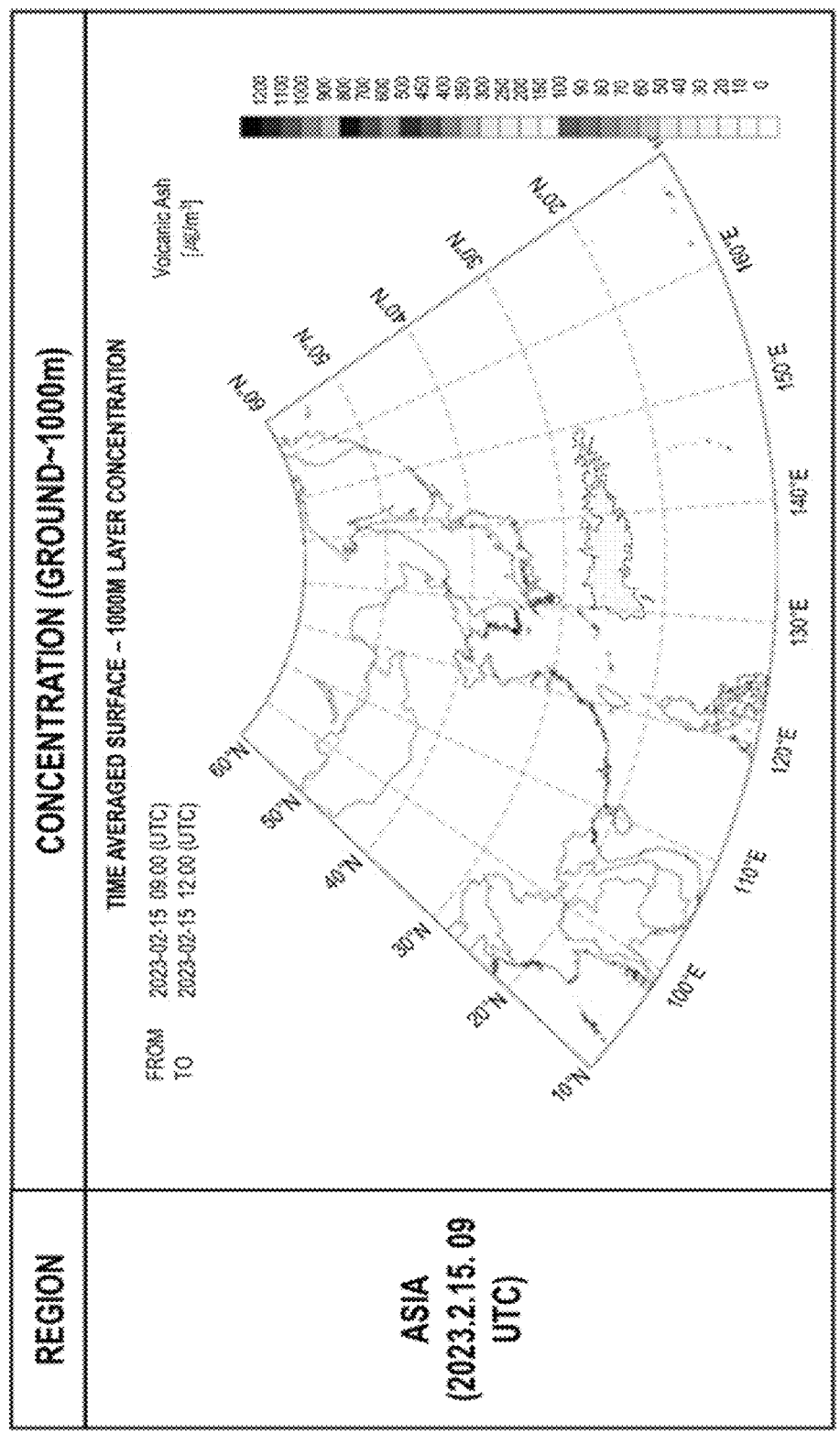
Figure 8D:
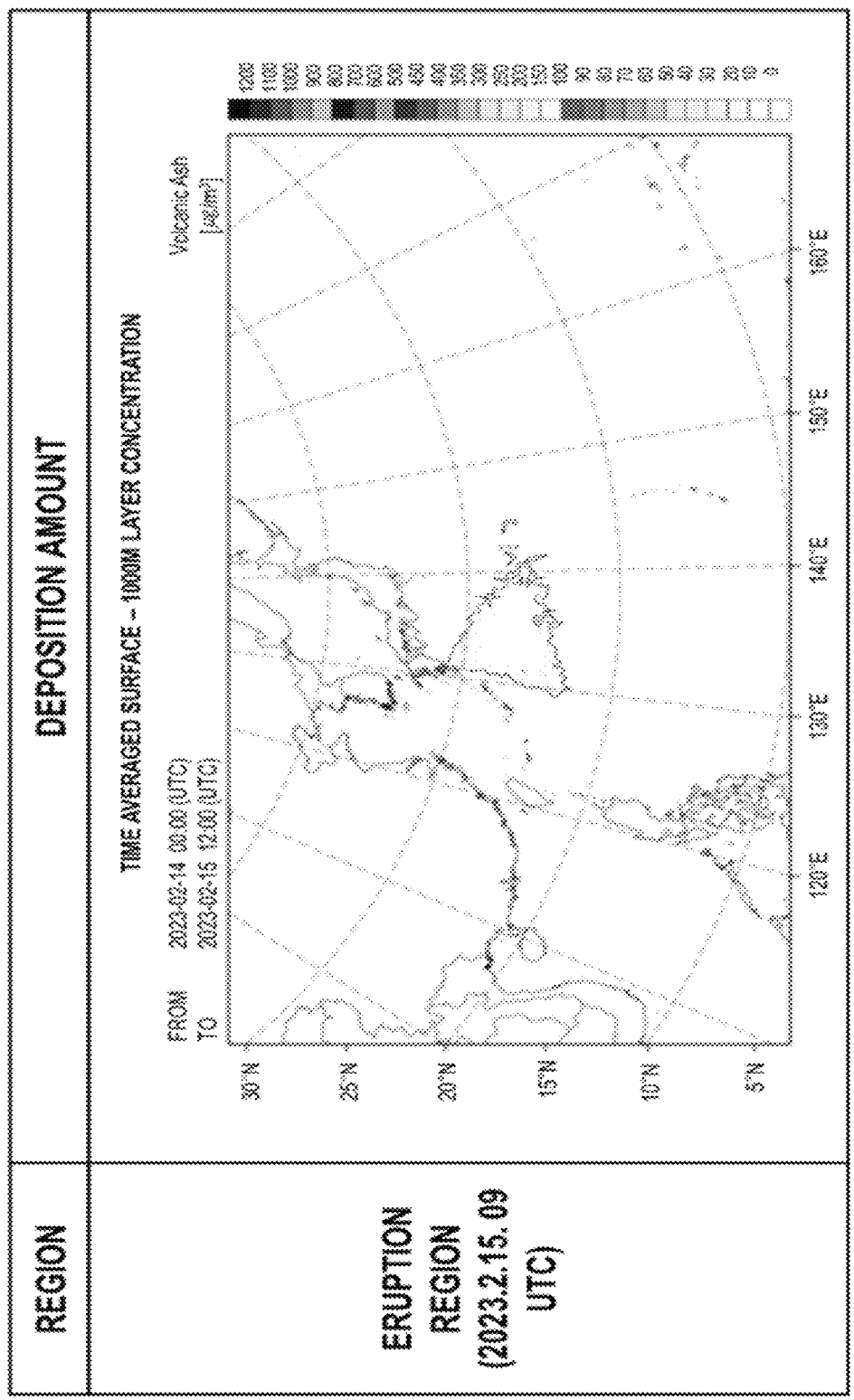
Figure 8E:
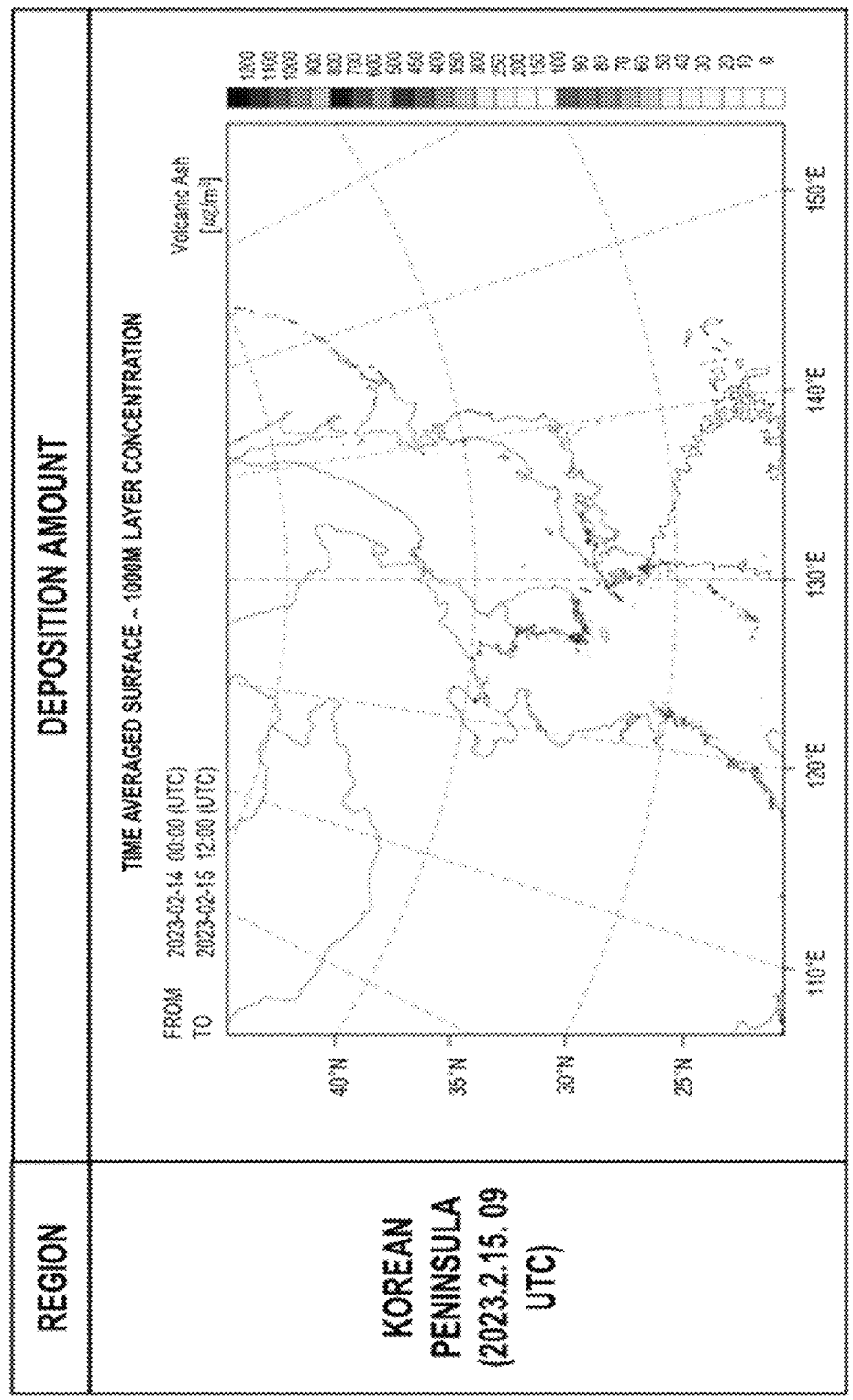
Figure 8F:
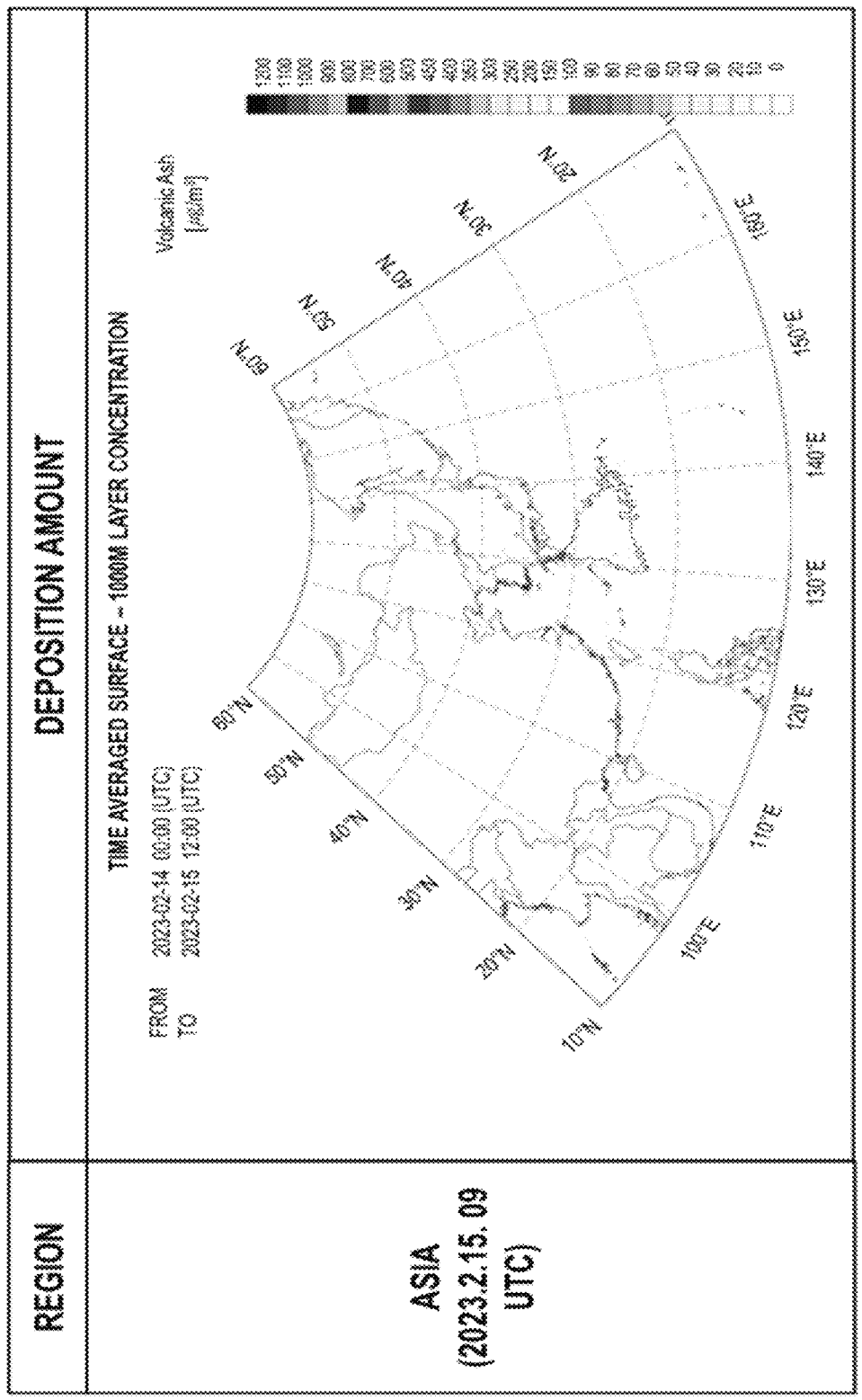
Figure 9A:
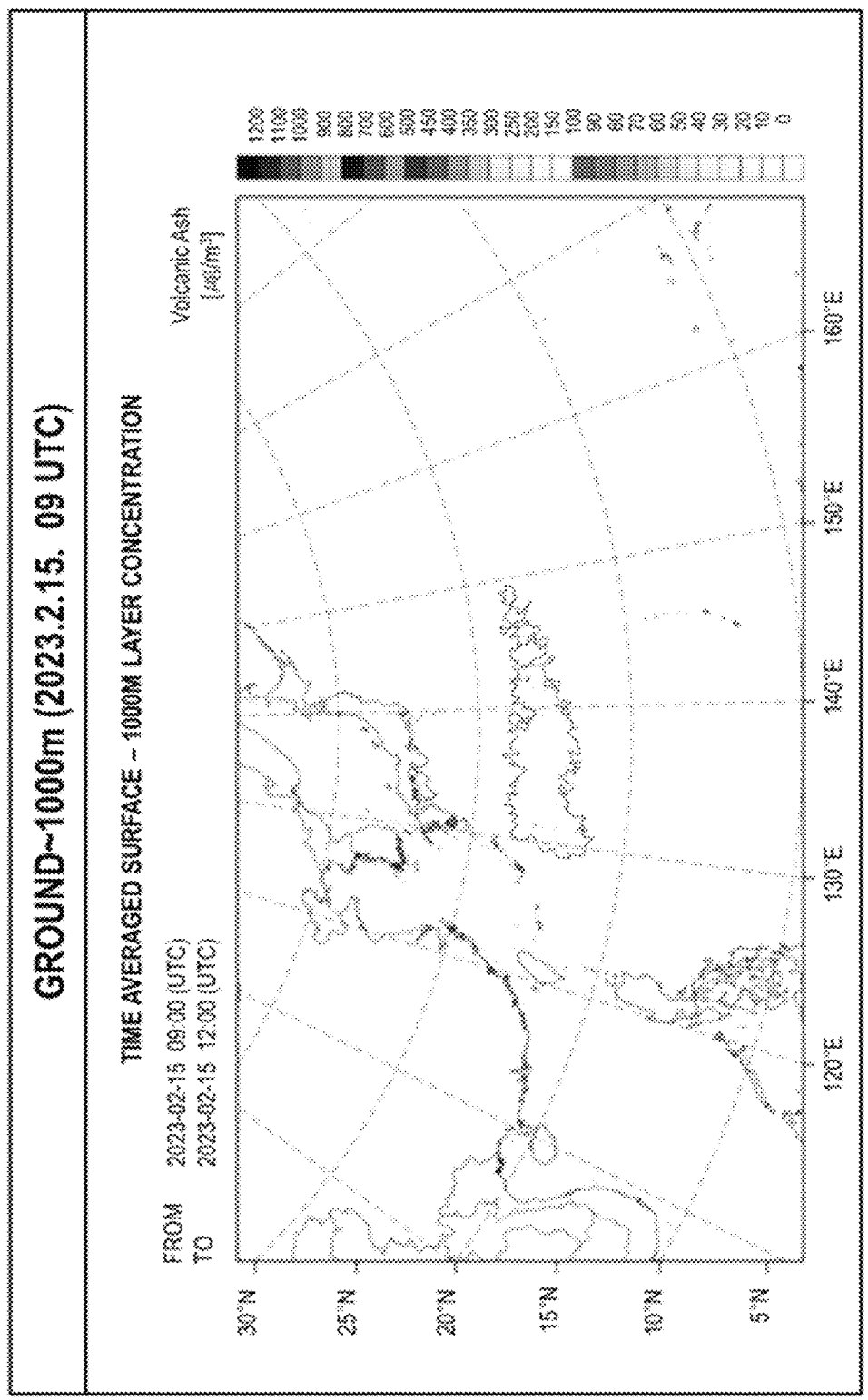
Figure 9B:
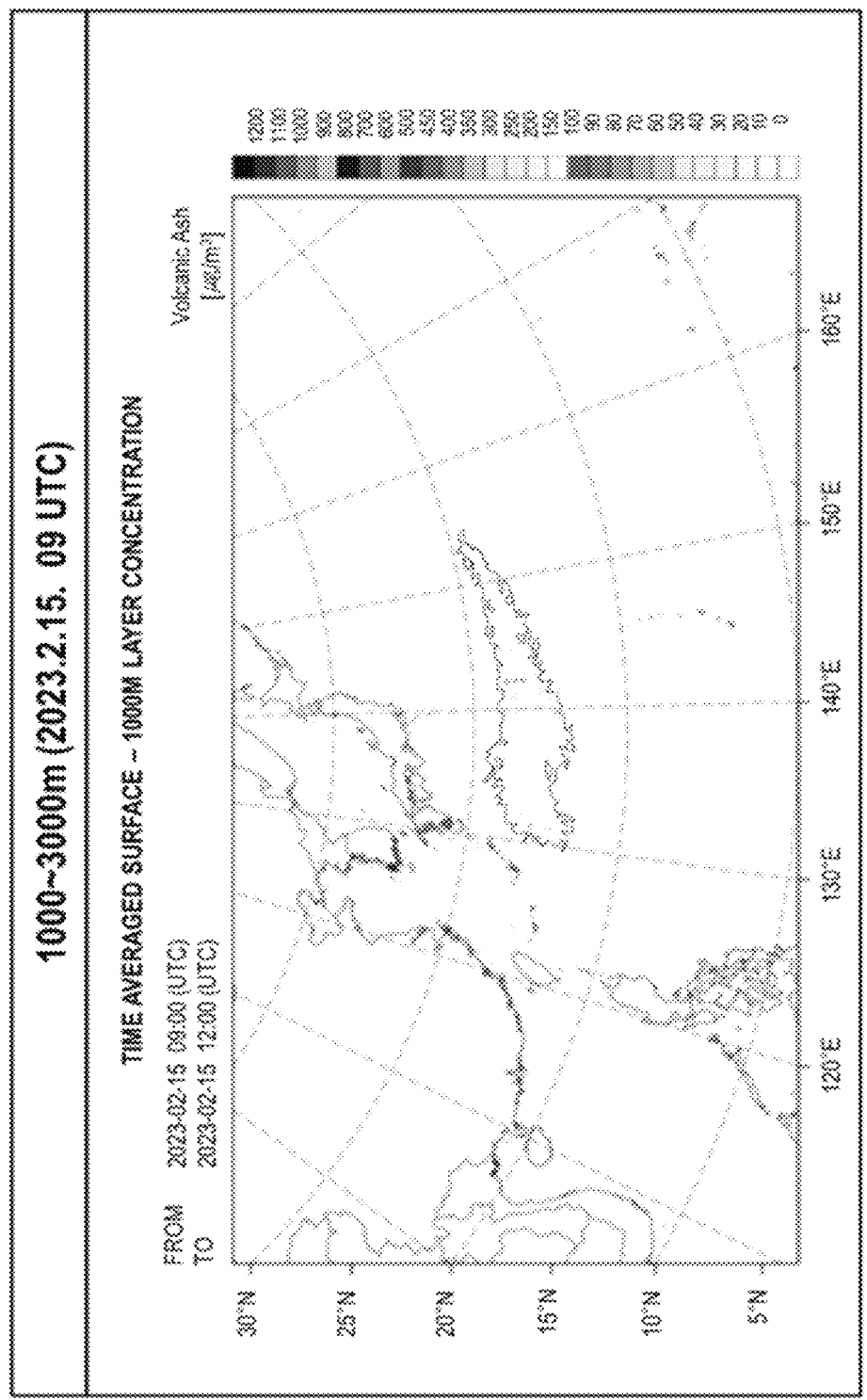
Figure 9C:
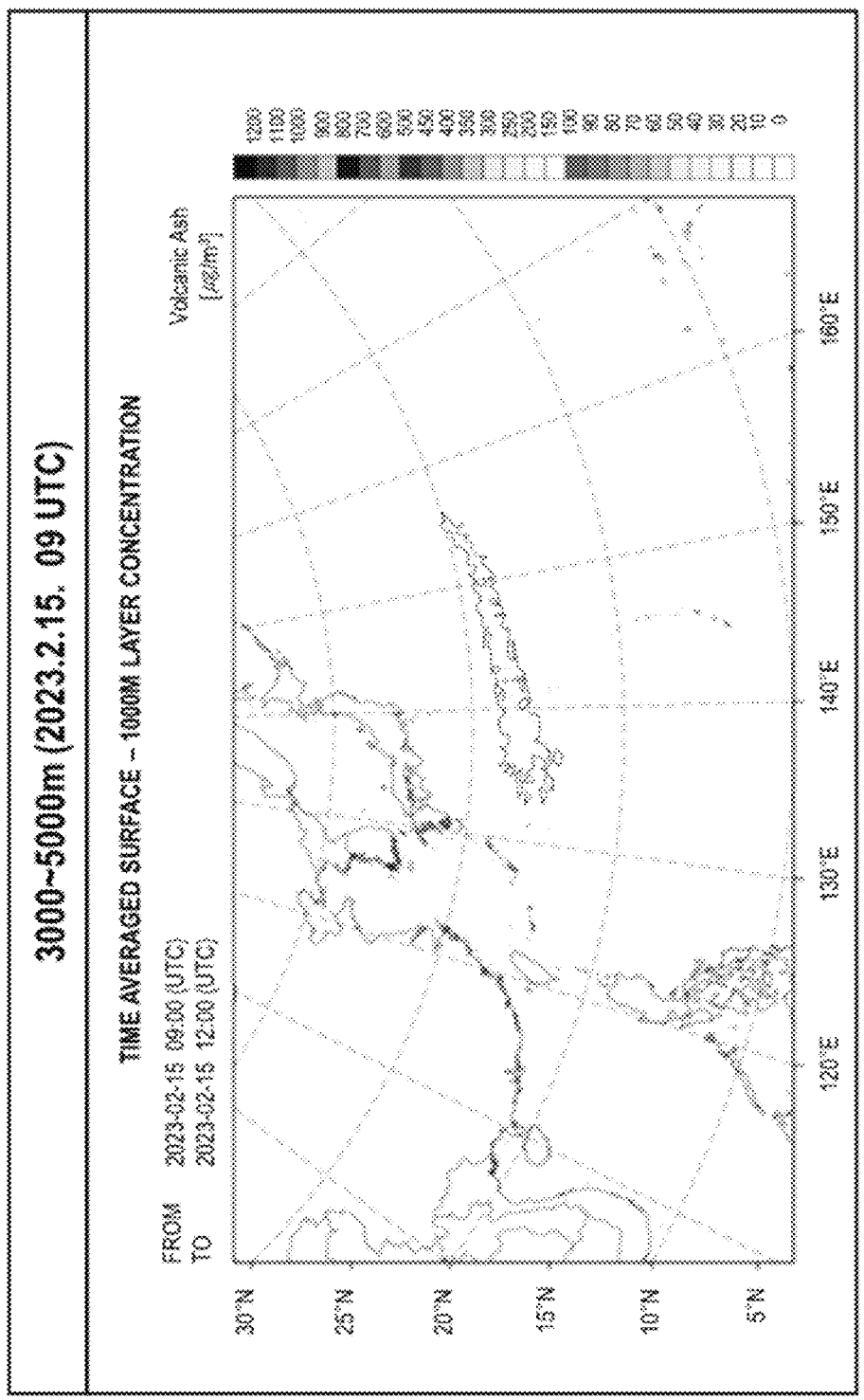
Figure 9D:
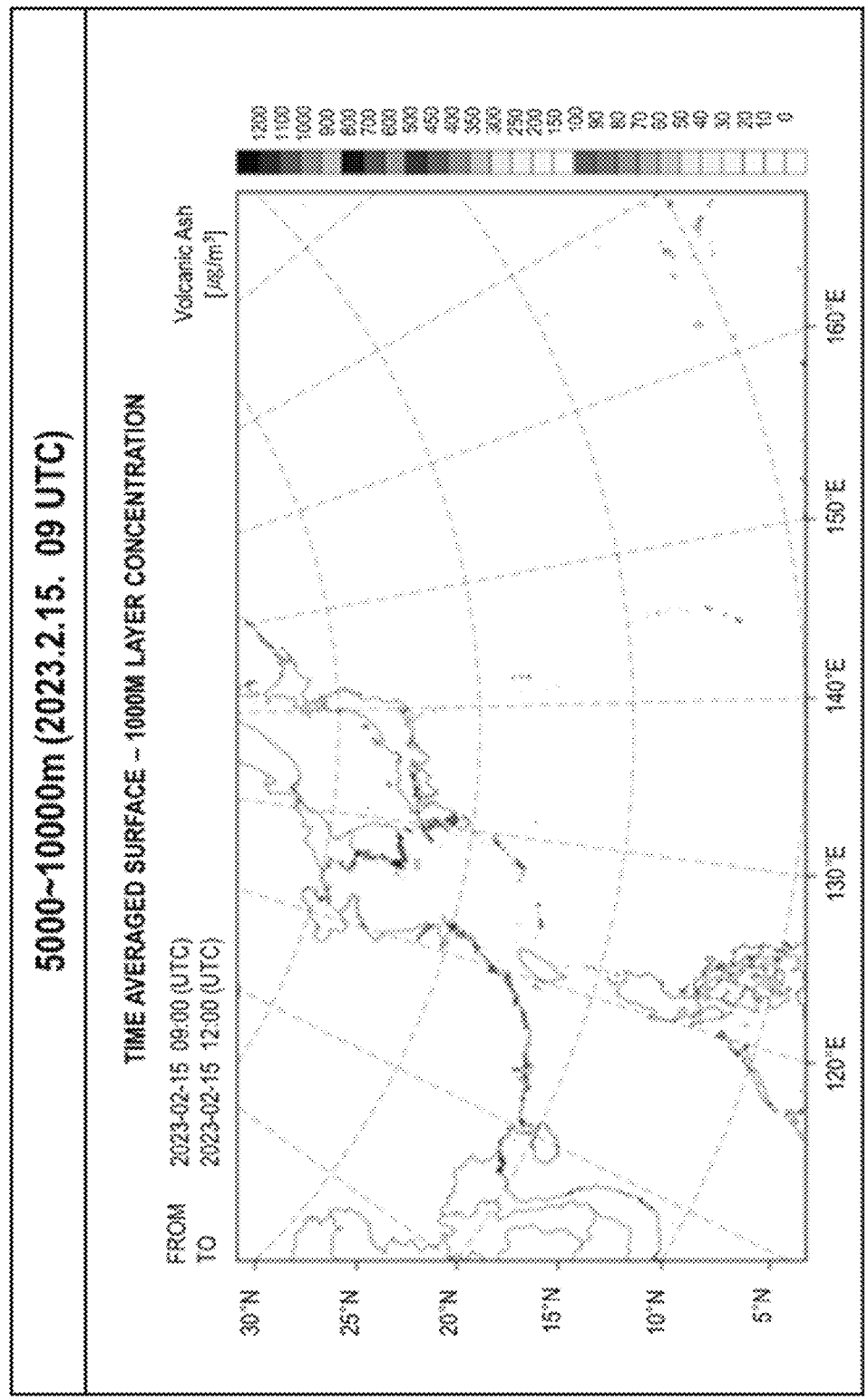

FIG. 6 shows an overall appearance of a display screen on which the volcanic ash concentration and volcanic ash deposition amount for the corresponding case are displayed.

Referring to FIG. 6, at a top 610 of the display screen, volcanic eruption-related information such as a volcano name (Sakurajima), volcano location (31 degrees 6 minutes north latitude, 130 degrees 65 minutes east longitude), volcano height (1,117 m), and eruption time (00:44 on Feb. 14, 2023), and a model start time (00:00 UTC on Feb. 14, 2023) may be checked.

Further, at a center of the display screen, a function for selecting a display region 620, a display altitude 630, and a display time 640 may be provided. The display region 620 may be divided into three regions: eruption region, the Korean Peninsula, and Asia. The display altitude 630 may be divided into four altitudes: 1,000 m, 3,000 m, 5,000 m, and 10,000 m. The display time 640 may be divided into three-hour intervals over 72 hours. Therefore, the volcanic ash concentration may be checked at three-hour intervals for three regions and four altitudes. Additionally, the volcanic ash deposition amount may be checked at three-hour intervals for four altitudes.

Meanwhile, a value of the volcanic ash concentration by altitude represents an average value of vertical layers. "1,000 m" is an average concentration of volcanic ash from the ground to 1,000 m. "3,000 m" is an average concentration of volcanic ash from 1,000 m to 3,000 m. "5,000 m" is an average concentration of volcanic ash from 3,000 m to 5,000 m. "10,000 m" is an average concentration of volcanic ash from 5,000 m to 10,000 m.

FIGS. 7A-7F show the prediction results for the case at 12-hour intervals. Referring to FIGS. 7A-7F, it can be seen that volcanic ash that erupted from Sakurajima Volcano began to spread to the south of the volcano, and the volcanic ash had moved to the vicinity of the Philippines 60 hours after the eruption began (2023.2.16. 12 UTC).

FIGS. 8A-8F show volcanic ash concentrations and volcanic ash deposition amounts by region for the case. Referring to FIGS. 8A-8F, it can be seen that the volcanic ash concentration at an altitude of 1,000 m at a specific time (2023.2.15. 09 UTC) was divided into an eruption region, the Korean Peninsula, and Asia. Further, it can be seen that the volcanic ash deposition amount at a specific time (2023.2.15. 09 UTC) was divided into the eruption region, the Korean Peninsula, and Asia.

FIGS. 9A-9D show volcanic ash concentrations by altitude for the case. Referring to FIGS. 9A-9D, a volcanic ash concentration at an altitude of 1,000 m, a volcanic ash concentration at an altitude of 3,000 m, a volcanic ash concentration at an altitude of 5,000 m, and a volcanic ash concentration at an altitude of 10,000 m at a specific time (2023.2.15. 09 UTC) may be checked.

The embodiments of the present disclosure have been described above with reference to FIGS. 1-9D. In the description referring to FIG. 1, an example of the device 100 for calculating the volcanic ash dispersion prediction information in real time, including the data collection unit 110, the preprocessing unit 120, the database 130, and the volcanic ash eruption rate calculation unit 140, has been described. The device 100 for calculating the volcanic ash dispersion prediction information in real time may be configured to include a transmission/reception unit, a memory, and a processor.

The transmission/reception unit of the device 100 for calculating the volcanic ash dispersion prediction information in real time may communicate with any external device. Furthermore, the device 100 for calculating the volcanic ash dispersion prediction information in real time may access a network through the transmission/reception unit to transmit or receive various types of data. The transmission/reception unit may broadly include a wired type transmission/reception unit and a wireless type transmission/reception unit. Since the wired type transmission/reception unit and the wireless type transmission/reception unit have their advantages and disadvantages, both the wired type transmission/reception unit and the wireless type transmission/reception unit may be provided in the device 100 for calculating the volcanic ash dispersion prediction information in real time. Here, in the case of the wired type transmission/reception unit, a wireless local region network (WLAN) type communication method such as Wi-Fi may be mainly used. Alternatively, in the case of the wireless type transmission/reception unit, a cellular communication method, such as a long-term evolution (LTE) or 5th generation (5G) communication method, may be used. However, a wireless communication protocol is not limited to the above-described example, and any appropriate wireless type communication method may be used. In the case of the wired type transmission/reception unit, local region network (LAN) or Universal Serial Bus (USB) communication is a representative example, but other methods may also be used.

In the memory of the device 100 for calculating the volcanic ash dispersion prediction information in real time, various types of data may be stored temporarily or semi-permanently. Examples of the memory may include a hard disk drive (HDD), a solid state drive (SSD), a flash memory, a read-only memory (ROM), a random access memory (RAM), and the like. The memory may be provided in the form of being built into the device 100 for calculating the volcanic ash dispersion prediction information in real time or in the form of being detachable from the device 100 for calculating the volcanic ash dispersion prediction information in real time.

In the memory, various types of data necessary for the operation of the device 100 for calculating the volcanic ash dispersion prediction information in real time, including an operating system (OS) for operating the device 100 for calculating the volcanic ash dispersion prediction information in real time or a program for operating each component of the device 100 for calculating the volcanic ash dispersion prediction information in real time, may be stored.

The processor of the device 100 for calculating the volcanic ash dispersion prediction information in real time may control overall operation of the device 100. Specifically, the processor may load and execute a program stored in the memory. The processor may be implemented as an application processor (AP), a central processing unit (CPU), a microcontroller unit (MCU), or similar devices, depending on hardware, software, or a combination thereof. In this case, hardware may be provided in the form of an electronic circuit that processes electrical signals to perform a control function, and software may be provided in the form of a program or code that drives hardware circuits.

Meanwhile, the disclosed embodiments may be implemented in the form of a recording medium on which instructions executable by a computer are stored. The instructions may be stored in the form of program code, and may generate a program module to perform operations of the disclosed embodiments when the instructions are executed by a processor. The recording medium may be implemented as a computer-readable recording medium.

Examples of the computer-readable recording medium include any type of recording medium storing instructions that can be decoded by a computer. For example, examples of the computer-readable recording medium may include an ROM, an RAM, a magnetic tape, a magnetic disk, a flash memory, an optical data storage, etc.

Further, the computer-readable recording medium may be provided in the form of a non-transitory storage medium. Here, the "non-transitory storage medium" is a tangible device and simply means that it does not contain signals (e.g., electromagnetic waves), and this term does not distinguish between a case where data is stored semi-permanently in a storage medium and a case where data is stored temporarily. For example, the "non-transitory storage medium" may include a buffer in which data is temporarily stored.

According to the embodiment, the methods according to various embodiments disclosed in this specification may be provided by being included in computer program products. The computer program products may be traded between sellers and buyers as commodities. The computer program products may be distributed in the form of machine-readable storage media (e.g., a compact disc read only memory (CD-ROM)), distributed online through an application store (e.g., Play Store™) or directly between two user devices (e.g., smartphones), or distributed online (e.g., downloaded or uploaded). In the case of online distribution, at least some of the computer program products may be temporarily stored or temporarily generated in a storage medium such as a memory of a server of a manufacturer, a memory of a server of an application store, or a memory of a relay server.

According to the method and device according to the embodiment of the present disclosure, in order to rapidly produce quantitative prediction information related to the impact of volcanic eruptions in countries neighboring Korea on Korea, immediately after volcanic ash advisory texts are collected, a volcanic ash dispersion prediction model can be automatically operated by identifying information related to volcanic eruptions from the volcanic ash advisory text, and volcanic ash dispersion prediction information can be produced in real time.

According to the method and device according to the embodiment of the present disclosure, the accuracy of a volcanic ash dispersion prediction model can be improved by applying a statistical ratio of particles with a diameter of less than 63 μm for each type of volcanic eruption to an existing eruption rate equation that is calculated using an eruption column height of a volcano.

According to the method and device according to the embodiment of the present disclosure, provided is a method and device for calculating volcanic ash dispersion prediction information in real time, in which, when a volcanic ash dispersion prediction model is operated, global climate data from the KIM and the ECMWF as well as climate data from the KMA's GDAPS based on a UM can be used as meteorological input data for a volcanic ash dispersion prediction model, and thus various volcanic ash dispersion ranges and volcanic ash concentration calculation systems.

According to the method and device according to the embodiment of the present disclosure, by expanding a model region of a volcanic ash dispersion prediction model from the existing East Asia region to a region including Europe, paths of volcanic ash dispersed from distant volcanoes that can affect Korea in the event of a large-scale volcanic eruption can be predicted.

Features, structures, effects, etc. described in the above-described exemplary embodiments are included in at least one exemplary embodiment of the present disclosure, but are not necessarily limited to only one exemplary embodiment. Furthermore, the features, structures, effects, etc. described in each embodiment may be combined or modified and implemented in other embodiments by those skilled in the art. It should be interpreted that contents related to such combinations and modifications are included in the scope of the present disclosure.

While the present disclosure has been particularly described with reference to embodiments, the embodiments are only exemplary embodiments of the present disclosure and the present disclosure is not limited thereto. It will be understood by those skilled in the art that modified examples and applications in other forms may be made without departing from the spirit and scope of the present disclosure. For example, each component specifically shown in the embodiments may be modified and implemented. In addition, it should be understood that differences related to these modified examples and applications are within the scope of the present disclosure as defined in the appended claims.

What is claimed is:

1. A method of calculating volcanic ash dispersion prediction information in real time in a first country, which is performed by a volcanic ash dispersion prediction system for calculating volcanic ash dispersion prediction information in real time, wherein the volcanic ash dispersion prediction system includes a processor and a non-transitory memory storing computer-readable instructions executable by the processor, wherein the method is performed by the processor of the volcanic ash dispersion prediction system using the computer-readable instructions and comprises:

collecting volcanic ash advisory texts from a volcanic ash advisory center located in a second country different from the first country in real time and collecting weather forecast data including weather related data of the second country in real time, wherein the collecting of the volcanic ash advisory texts comprises collecting a volcanic ash advisory text from the volcanic ash advisory center;

preprocessing the collected volcanic ash advisory texts and preprocessing the collected weather forecast data, wherein the preprocessing of the collected volcanic ash advisory texts comprises preprocessing the collected volcanic ash advisory text, and the preprocessing of the collected weather forecast data comprises converting a format of the collected weather forecast data to a format of meteorological input data for a Hybrid Single-Particle Lagrangian Integrated Trajectory (HYSPLIT) model being operated by the volcanic ash dispersion prediction system; and calculating a volcanic ash eruption rate using some of the preprocessed volcanic ash advisory texts and the preprocessed weather forecast data, wherein the method further comprises operating the HYSPLIT model by the volcanic ash dispersion prediction system using the calculated volcanic ash eruption rate as an input data of the HYSPLIT model, wherein the operating of the HYSPLIT model comprises operating the HYSPLIT model by the volcanic ash dispersion prediction system using the collected [new] volcanic ash advisory text and the collected weather forecast data to obtain predicted values of a volcanic ash concentration and a volcanic ash deposition amount, wherein the HYSPLIT model includes a volcanic ash dispersion prediction model which is to predict volcanic ash dispersion, wherein the calculating of the volcanic ash eruption rate includes:

determining a mass fraction of particles with a diameter less than a reference value according to a type of volcanic eruption and a scale of a volcanic eruption; and calculating the volcanic ash eruption rate using at least one of the mass fraction of the particles and a ratio of a volcanic ash concentration to the mass fraction of the particles, wherein the volcanic ash eruption rate is calculated by Equation 1, $$\text{eruption rate} = Re \times M_{63} \times e^{f(H)}, \quad \text{[Equation 1]}$$

$$Re = A_{10}/A_{63},$$

$$f(H) = 7.526 \times H^{0.2505}$$

where, $M_{63}$ denotes a mass fraction of particles in volcanic ash that have a diameter of less than 63 µm and are floatable in the air for several hours or more, wherein $A_{10}$ and $A_{63}$ are diameters, Re denotes a ratio of a $PM_{10}$ concentration to the mass fraction of the particles in the volcanic ash that have a diameter of less than 63 µm, and H denotes an eruption column height, wherein the preprocessing of the collected volcanic ash advisory text comprises extracting volcanic eruption-related information to be used as input data for the HYSPLIT model, wherein the volcanic eruption-related information includes one or more of a volcano location, a volcano height, an eruption time, and an eruption column height, wherein the format of the meteorological input data for the HYSPLIT model is an Air Resource Laboratory (ARL) format, wherein the converting of the format of the collected weather forecast data to the format of the meteorological input data for the HYSPLIT model comprises converting the format of the collected weather forecast data to the ARL format, wherein the meteorological input data includes a plurality of pieces of meteorological input data for the HYSPLIT model, and each of the plurality of pieces of meteorological input data has the ARL format, and wherein the preprocessing of the collected weather forecast data comprises:

based on the volcanic ash advisory text being identified from among the collected volcanic ash advisory texts by the volcanic ash dispersion prediction system, using meteorological input data closest to a time of arrival of the volcanic ash advisory text from among the plurality of pieces of meteorological input data in the ARL format as input weather data of the HYSPLIT model.

2. A volcanic ash dispersion prediction system for calculating volcanic ash dispersion prediction information in real time in a first country, the system comprising:

a non-transitory memory containing computer-readable instructions; and a processor configured to execute the instructions, wherein the processor is configured to:

collect volcanic ash advisory texts from a volcanic ash advisory center located in a second country different from the first country in real time and collect weather forecast data including weather related data of the second country in real time, wherein the collecting of the volcanic ash advisory texts comprises collecting a volcanic ash advisory text from the volcanic ash advisory center, preprocess the collected volcanic ash advisory texts and preprocess the collected weather forecast data, wherein the preprocessing of the collected volcanic ash advisory texts comprises preprocessing the collected volcanic ash advisory text, and the preprocessing of the collected weather forecast data comprises converting a format of the collected weather forecast data to a format of meteorological input data for a Hybrid Single-Particle Lagrangian Integrated Trajectory (HYSPLIT) model being operated by the volcanic ash dispersion prediction system, and calculate a volcanic ash eruption rate using some of the preprocessed volcanic ash advisory texts and the preprocessed weather forecast data, wherein the processor is further configure to operate the HYSPLIT model by using the calculated volcanic ash eruption rate as an input data of the HYSPLIT model, wherein the processor is further configure to operate the HYSPLIT model by using the collected volcanic ash advisory text and the collected weather forecast data to obtain predicted values of a volcanic ash concentration and a volcanic ash deposition amount, wherein the HYSPLIT model includes a volcanic ash dispersion prediction model which is to predict volcanic ash dispersion, wherein the processor is configured to:

determine a mass fraction of particles with a diameter less than a reference value according to a type of volcanic eruption and a scale of volcanic eruption; and calculate the volcanic ash eruption rate using at least one of the mass fraction of the particles and a ratio of a volcanic ash concentration to the mass fraction of the particles, wherein the volcanic ash eruption rate is calculated by Equation 1, $$\text{eruption rate} = \text{Re} \times M_{63} \times e^{f(H)}, \quad \text{[Equation 1]}$$

$$\text{Re} = A_{10}/A_{63},$$

$$f(H) = 7.526 \times H^{0.2505}$$

where, $M_{63}$ denotes a mass fraction of particles in volcanic ash that have a diameter of less than 63 μm and are floatable in the air for several hours or more, wherein $A_{10}$ and $A_{63}$ are diameters, Re denotes a ratio of a $PM_{10}$ concentration to the mass fraction of the particles in the volcanic ash that have a diameter of less than 63 μm, and H denotes an eruption column height, wherein the preprocessing of the collected volcanic ash advisory text comprises extracting volcanic eruption-related information to be used as input data for the HYSPLIT model, wherein the volcanic eruption-related information includes one or more of a volcano location, a volcano height, an eruption time, and an eruption column height, wherein the format of the meteorological input data for the HYSPLIT model is an Air Resource Laboratory (ARL) format, wherein the converting of the format of the collected weather forecast data to the format of the meteorological input data for the HYSPLIT model comprises converting the format of the collected weather forecast data to the ARL format, wherein the meteorological input data includes a plurality of pieces of meteorological input data for the HYSPLIT model, and each of the plurality of pieces of meteorological input data has the ARL format, and wherein the preprocessing of the collected weather forecast data comprises:

based on the volcanic ash advisory text being identified from among the collected volcanic ash advisory texts by the volcanic ash dispersion prediction system, using meteorological input data closest to a time of arrival of the volcanic ash advisory text from among the plurality of pieces of meteorological input data in the ARL format as input weather data of the HYSPLIT model.

* * * * *